(12) United States Patent
Wu

(10) Patent No.: US 12,028,840 B2
(45) Date of Patent: Jul. 2, 2024

(54) CONTROL CHANNEL TRANSMISSION METHOD AND APPARATUS, AND STORAGE MEDIUM

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 356 days.

(21) Appl. No.: 17/550,814

(22) Filed: Dec. 14, 2021

(65) Prior Publication Data

US 2022/0110118 A1 Apr. 7, 2022

Related U.S. Application Data

(63) Continuation of application No. PCT/CN2019/096047, filed on Jul. 15, 2019.

(51) Int. Cl.
*H04W 72/0446* (2023.01)
*H04W 24/08* (2009.01)

(52) U.S. Cl.
CPC ....... *H04W 72/0446* (2013.01); *H04W 24/08* (2013.01)

(58) Field of Classification Search
CPC . H04W 72/0446; H04W 74/08; H04W 48/12; H04W 74/0808; H04W 72/04;
(Continued)

(56) References Cited

U.S. PATENT DOCUMENTS

2017/0332359 A1* 11/2017 Tsai et al. ........... H04W 72/042
2018/0027493 A1   1/2018 Li et al.
(Continued)

FOREIGN PATENT DOCUMENTS

CN    106304371 A    1/2017
CN    108886818 A    11/2018
(Continued)

OTHER PUBLICATIONS

CN 111294935 A) »> An Initial Signal Processing Method, Apparatus And Storage Medium (title). (Year: 2020).*
(Continued)

*Primary Examiner* — Meless N Zewdu
(74) *Attorney, Agent, or Firm* — Ladas & Parry, LLP

(57) ABSTRACT

Embodiments of the present application provide a control channel transmission method and apparatus, and a storage medium. A network device determines a first search space set within a COT of a fixed frame period, transmits a first PDCCH in the first search space when it is determined that a resource in the COT is available, and does not transmit a downlink channel or a downlink signal in the COT when it is determined that a resource in the COT is unavailable, where the first PDCCH is used to transmit slot structure indication information, and the slot structure indication information is used to determine a slot structure of the COT. Correspondingly, a terminal device, after determining a first search space set within a COT of a fixed frame period, monitors a first PDCCH according to the first search space set.

15 Claims, 11 Drawing Sheets

(58) Field of Classification Search
CPC ..... H04W 48/00; H04W 52/00; H04W 52/02; H04W 72/20; H04W 72/231; H04W 72/232; H04W 72/21; H04W 72/23; H04W 74/002; H04W 74/00; H04W 76/27; H04W 76/20; H04W 8/02; H04W 88/00; H04W 88/12; H04W 88/02; H04W 88/08; H04W 88/18; H04W 74/006; H04W 24/08; H04W 24/10; H04W 28/02; H04L 5/0092; H04L 5/00

See application file for complete search history.

(56) References Cited

U.S. PATENT DOCUMENTS

| | | | |
|---|---|---|---|
| 2019/0075581 A1* | 3/2019 | Salem et al. | H04W 72/1268 |
| 2019/0334577 A1* | 10/2019 | Damnjanovic et al. | H04B 1/7143 |
| 2019/0335500 A1* | 10/2019 | Zhang et al. | H04W 74/0808 |
| 2019/0342045 A1* | 11/2019 | Radulescu et al. | H04L 5/0035 |
| 2019/0394772 A1* | 12/2019 | Li et al. | H04W 72/0446 |
| 2020/0021423 A1* | 1/2020 | Liu et al. | H04L 5/1469 |
| 2020/0037336 A1* | 1/2020 | Sun et al. | H04W 72/10 |

FOREIGN PATENT DOCUMENTS

| | | | |
|---|---|---|---|
| CN | 109151833 A | 1/2019 | |
| CN | 109802732 A | 5/2019 | |
| EP | 3648365 A1 * | 3/2018 | ............... H04B 7/06 |
| EP | 3648365 A1 * | 5/2020 | ........... H04B 7/0695 |
| WO | WO-2019140060 A1 * | 7/2019 | ........... H04L 5/0053 |
| WO | 2021007759 A1 | 1/2021 | |

OTHER PUBLICATIONS

CN 111278092 A) »> A Channel Monitoring Method, Terminal And Network Equipment (see title) (Year: 2020).*
KR 20200018389 A) »> Wake-Up Signal For Cellular Communication In Unlicensed Spectrum (see title) (Year: 2020).*
JP 2021514151 A) »> Temporary Floating DL Timing Approach For Unlicensed Radio Band Scenarios (see title) (Year: 2021).*
KR 20210062104 A) »> Method For Transmitting And Receiving A Downlink Signal Between A Terminal And A Base Station In A Wireless Communication System Supporting An Unlicensed Band, And A Device Supporting Same (see title) (Year: 2021).*
RU 2754678 C1) »> Processing of an Sps Scheduling Cancellation for a Dynamic Codebook for a Repeat Request Acknowledgement (HARQ-ACK) Based On a Group of Code Blocks (see title) (Year: 2021).*
CN 111757431 A) »> Communication Method And Device (see title) (Year: 2020).*
CN 111757516 A) »> Transmission Of Downlink Control Information, Processing Method And Device (see title) (Year: 2020).*
KR 20200034559 A) »> Method and Apparatus for Transmission and Reception of Control Information in Wireless Communication System (see title) (Year: 2020).*
BR 112019026709 A2) »> Terminal And Radio Communication Method For A Terminal (see title) (Year: 2020).*
WO 2015113223 A1) »> Channel Monitoring Method and Device (see title) (Year: 2015).*
The Extended European Search Report of corresponding European application No. 19937728.4, dated May 13, 2022.
Huawei et al: "DL channels and signals in NR unlicensed band", 3GPP Draft; R1-1906042; May 13, 2019.
Interdigital et al: 'Discussion on PDCCH monitoring after a COT initiated by gNB in Nr-U' 3GPP Draft; R1-1907308; May 13, 2019.
International Search Report (ISR) dated Mar. 27, 2020 for Application No. PCT/CN2019/096047, and its English translation provide by WIPO.
Written Opinion dated Mar. 27, 2020 for Application No. PCT/CN2019/096047, and its English translation provided by Google Translate.
R1-1906761; DL signals and channels for gNB initiated COT 3GPP TSG RAN WG1 #97 R1-1906761 Reno, USA, May 13-17, 2019, entire document.
The first Office Action of corresponding Chinese application No. 201980092596.3, dated Oct. 10, 2022 with machine translation by Global Dossier.
The third Office Action of corresponding Chinese application No. 201980092596.3, dated Aug. 22, 2023.
The second Office Action of corresponding Chinese application No. 201980092596.3, dated May 12, 2023 and its English translation provided by foreign associate.

* cited by examiner

| CCE set | CCE0 | CCE1 | CCE2 | CCE3 | CCE4 | CCE5 | CCE6 | CCE7 | CCE8 | CCE9 | CCE10 | CCE11 | CCE12 | CCE13 | CCE14 | CCE15 |
|---|---|---|---|---|---|---|---|---|---|---|---|---|---|---|---|---|
| Aggregation level 1, CCEs monitored by a terminal device when there are 6 candidate PDCCHs | CCE0 | CCE1 | CCE2 | CCE3 | CCE4 | CCE5 | | | | | | | | | | |
| Aggregation level 2, CCEs monitored by the terminal device when there are 4 candidate PDCCHs | CCE0 | CCE1 | CCE2 | CCE3 | CCE4 | CCE5 | CCE6 | CCE7 | | | | | | | | |
| Aggregation level 4, CCEs monitored by the terminal device when there are 3 candidate PDCCHs | CCE0 | CCE1 | CCE2 | CCE3 | CCE4 | CCE5 | CCE6 | CCE7 | CCE8 | CCE9 | CCE10 | CCE11 | | | | |

FIG. 3

CONTROL CHANNEL TRANSMISSION METHOD AND APPARATUS, AND STORAGE MEDIUM

CROSS-REFERENCE TO RELATED APPLICATIONS

This application is a continuation of International Application No. PCT/CN2019/096047, filed on Jul. 15, 2019, the disclosure of which is hereby incorporated by reference in its entirety.

TECHNICAL FIELD

Embodiments of the present application relate to the field of communication technologies and, in particular, to a control channel transmission method and apparatus, and a storage medium.

BACKGROUND

With the rapid development of communication technologies, a new radio based access to unlicensed spectrum (new radio based access to unlicensed spectrum, NR-U) system supports a frame based equipment (frame based equipment, FBE) channel access mode. In the FBE channel access mode, a frame structure occurs periodically. One frame structure has a fixed frame period. One fixed frame period includes channel occupancy time (channel occupancy time, COT) and idle time. A communication device performs channel detection in the idle time. If a channel detection result shows a channel is idle, the communication device may perform signal transmission; otherwise, it may not perform signal transmission.

However, if based on a prior art scheme according to which a terminal device monitors a downlink control channel, regardless of whether a network device transmits the downlink control channel, the terminal device will continuously monitor the downlink control channel in the channel occupancy time of a fixed frame period. As a result, the terminal device performs information monitoring for long time, and there is a problem of high power consumption and a waste of resources.

SUMMARY

Embodiments of the present application provide a control channel transmission method and apparatus, and a storage medium, which have solved the problem of high power consumption and resource waste resulting from long-term blind monitoring by a terminal device in an FBE-based channel access mode.

In a first aspect, an embodiment of the present application provides a control channel transmission method, including:
  determining, by a terminal device, a first search space set within a channel occupancy time (COT) of a fixed frame period; and
  monitoring, by the terminal device, a first physical downlink control channel (PDCCH) according to the first search space set, where the first PDCCH is used to transmit slot structure indication information, and the slot structure indication information is used to determine a slot structure of the COT.

In a second aspect, an embodiment of the present application provides a control channel transmission method, including:
  determining, by a network device, a first search space set within a channel occupancy time (COT) of a fixed frame period;
  transmitting, by the network device, a first physical downlink control channel (PDCCH) in the first search space set if the network device determines that a resource in the COT is available, where the first PDCCH is used to transmit slot structure indication information, and the slot structure indication information is used to determine a slot structure of the COT; and/or,
  not transmitting, by the network device, a downlink channel or a downlink signal in the COT if the network device determines that a resource in the COT is unavailable.

In a third aspect, an embodiment of the present application provides a control channel transmission apparatus, including: a determining module and a monitoring module;
  where the determining module is configured to determine a first search space set within a channel occupancy time (COT) of a fixed frame period; and
  the monitoring module is configured to monitor a first physical downlink control channel (PDCCH) according to the first search space set, the first PDCCH is used to transmit slot structure indication information, and the slot structure indication information is used to determine a slot structure of the COT.

In a fourth aspect, an embodiment of the present application provides a control channel transmission apparatus, including: a determining module and a transmitting module;
  where the determining module is configured to determine a first search space set within a channel occupancy time (COT) of a fixed frame period;
  the transmitting module is configured to transmit a first physical downlink control channel (PDCCH) in the first search space set when the determining module determines that a resource in the COT is available, the first PDCCH is used to transmit slot structure indication information, and the slot structure indication information is used to determine a slot structure of the COT; and/or,
  the determining module, when determining that a resource in the COT is unavailable, is further configured to determine not to transmit a downlink channel or a downlink signal in the COT.

In a fifth aspect, an embodiment of the present application provides a control channel transmission apparatus, including:
  a processor, a memory, a transceiver, and an interface in communication with a network device;
  where the memory has stored therein a computer-executable instruction; and
  the processor executes the computer-executable instruction stored in the memory to enable the processor to execute the method described above according to the first aspect.

In an implementation, the above-described processor may be a chip.

In a sixth aspect, an embodiment of the present application provides a control channel transmission apparatus, including:
  a processor, a memory, a transceiver, and an interface in communication with a terminal device;
  where the memory has stored therein a computer-executable instruction; and the processor executes the computer-executable instruction stored in the memory to enable the processor to execute the method described above according to the second aspect.

In an implementation, the above-described processor may be a chip.

In a seventh aspect, an embodiment of the present application may provide a computer-readable storage medium having stored therein a computer-executable instruction, where the method according to the first aspect is implemented when the computer-executable instruction is executed by a processor.

In an eighth aspect, an embodiment of the present application may provide a computer-readable storage medium having stored therein a computer-executable instruction, where the method according to the second aspect is implemented when the computer-executable instruction is executed by a processor.

In a ninth aspect, an embodiment of the present application provides a program, where the method according to the first aspect is executed when the program is executed by a processor.

In a tenth aspect, an embodiment of the present application provides a program, where the method according to the second aspect is executed when the program is executed by a processor.

In an eleventh aspect, an embodiment of the present application provides a computer program product including a program instruction, where the program instruction is used to implement the method according to the first aspect.

In a twelfth aspect, an embodiment of the present application provides a computer program product including a program instruction, where the program instruction is used to implement the method according to the second aspect.

In a thirteenth aspect, an embodiment of the present application provides a chip including a processing module and a communication interface, where the processing module can execute the method according to the first aspect.

Further, the chip also includes a storage module (such as a memory), where the storage module is configured to store an instruction, the processing module is configured to execute the instruction stored in the storage module, and execution of the instruction stored in the storage module enables the processing module to execute the method according to the first aspect.

In a fourteenth aspect, an embodiment of the present application provides a chip including a processing module and a communication interface, where the processing module can execute the method according to the second aspect.

Further, the chip also includes a storage module (such as a memory), where the storage module is configured to store an instruction, the processing module is configured to execute the instruction stored in the storage module, and execution of the instruction stored in the storage module enables the processing module to execute the method according to the second aspect.

In a fifteenth aspect, an embodiment of the present application provides a communication system including a terminal device and a network device;

where the terminal device is the apparatus described above according to the third aspect, and the network device is the apparatus described above according to the fourth aspect.

According to the control channel transmission method and apparatus, and the storage medium provided in the embodiments of the present application, a network device determines a first search space set within a COT of a fixed frame period, transmits a first PDCCH in the first search space when it is determined that a resource in the COT is available, and does not transmit a downlink channel or a downlink signal in the COT when it is determined that a resource in the COT is unavailable, where the first PDCCH is used to transmit slot structure indication information, and the slot structure indication information is used to determine a slot structure of the COT. Correspondingly, a terminal device, after determining a first search space set within a COT of a fixed frame period, monitors a first PDCCH according to the first search space set, thereby determining that whether slot structure indication information for determining a slot structure of the COT can be acquired, which is able to assist downlink control information detection to a certain extent, thereby avoiding a problem of resource waste resulting from long-term detection.

BRIEF DESCRIPTION OF DRAWINGS

FIG. 3 is a schematic diagram of CCEs that need to be monitored in a search space set;

DESCRIPTION OF EMBODIMENTS

Figure 1:
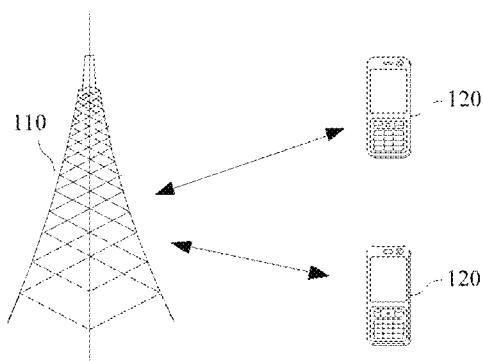
FIG. 1 is a schematic structural diagram of a communication system according to an embodiment of the present application.

To illustrate objections, technical solutions and advantages of the embodiments of the present application more clearly, the technical solutions in the embodiments of the present application will be clearly and comprehensively described hereunder with reference to the accompanying drawings of the embodiments of the present application. Obviously, the described embodiments are a part of the embodiments of the present application, rather than all embodiments of the present application. All other embodiments obtained by those of ordinary skilled in the art based on the embodiments of the present application without any creative effort should fall into the protection scope of the present application.

The terms such as "first", and "second" in the specification and the claims as well as the above accompany drawings of the present application are used to distinguish similar objects, but not intended to describe a specific order or sequence. It will be appreciated that the data used in this way may be interchangeable under appropriate circumstances, such that the embodiments of the present application described herein can be implemented in an order other than those illustrated or described herein. Moreover, the terms such as "include" and "have" and any variation thereof are intended to cover a non-exclusive inclusion, e.g., processes, methods, systems, products or devices that encompass a series of steps or units are not necessarily limited to those steps or units that are explicitly listed, but may include other steps or units that are not explicitly listed or inherent to these processes, methods, products or devices.

Radio spectrum is a carrier for propagation of mobile communication signals, and is a limited non-renewable natural resource and a precious national strategic resource. Therefore, each country has a specialized management agency for the radio spectrum and induces specific policies and regulations to achieve unified planning and management of the radio spectrum. At present, most countries adopt a fixed spectrum assignment strategy for spectrum management, that is, spectrum resources are managed by government authorities and assigned to fixed authorized users, ensuring that excessive mutual interference between users can be avoided and spectrum resources can be better used. Currently, spectrum resources can be divided into two categories: licensed spectrum (licensed spectrum) and unlicensed spectrum (unlicensed spectrum).

The licensed spectrum is subject to strict restriction and protection, and only access by authorized users and their devices that meet specifications is allowed, moreover, users have to pay for this. At present, important departments such as public security, railway, civil aviation, radio and television, and telecommunications all have certain authorized spectrum. Communications of equipment within these departments operates on their licensed spectrum, especially in the telecommunications industry. Terminal devices such as mobile phones communicate with each other over licensed spectrum owned by operators. The three major operators all have specific frequency bands authorized by the State Radio Regulation, so that the public mobile communications is protected from interference.

The unlicensed spectrum is spectrum divided by countries and regions that can be used for radio device communications. This spectrum is generally considered to be shared spectrum, that is, communication devices in different communication systems can access and use the spectrum as long as regulatory requirements set by the countries or regions on the spectrum are satisfied, and there is no need to apply for a proprietary spectrum authorization from the government. For example, for WiFi and Bluetooth which are frequently used in daily life, transmission is performed through the unlicensed spectrum.

In order to allow various communication systems that use the unlicensed spectrum for wireless communication to coexist friendly on the spectrum, some countries or regions have stipulated regulations that must be met to use the unlicensed spectrum. For example, communication devices follow a "listen before talk (listen before talk, LBT)" principle, that is, there is a need to perform channel detection first before a communication device performs signal transmission on a channel of unlicensed spectrum, and the communication device can perform signal transmission only when a channel detection result shows that the channel is idle; and if a channel detection result of the communication device on the channel of unlicensed spectrum shows that the channel is busy, the communication device cannot perform signal transmission. In order to ensure fairness, during one transmission, the duration in which a communication device uses a channel of unlicensed spectrum for signal transmission cannot exceed a maximum channel occupancy time (maximum channel occupancy time, MCOT).

A brief introduction will be made hereunder first with regard to a schematic diagram of an architecture of a communication system applicable to an embodiment of the present application.

FIG. 1 is a schematic structural diagram of a communication system according to an embodiment of the present application. As shown in FIG. 1, the communication system may include a network device 110 and multiple terminal devices 120 located within coverage of the network device 110. FIG. 1 exemplarily shows one network device 110 and two terminal devices 120.

In an implementation, the communication system may include multiple network devices 110, and other numbers of terminal devices 120 may be included within the coverage of each of the network devices. The embodiments of the present application do not make a limitation to the number of network devices 110 and terminal devices 120 included in the communication system.

As shown in FIG. 1, the terminal devices 120 are wirelessly connected to the network device 110. For example, the network device 110 and the multiple terminal devices 120 may use unlicensed spectrum for wireless communication.

In an implementation, device to device (Device to Device, D2D) communication may be performed between the terminal devices 120.

It is understandable that FIG. 1 is only a schematic diagram. The communication system may also include other network device such as a core network device, a wireless relay device and a wireless backhaul device, or may include other network entities such as a network controller, and a mobility management entity; and the embodiments of the present application are not limited thereto.

The technical solutions in the embodiments of the present application can be applied to various communication systems, such as a global system of mobile communication (global system of mobile communication, GSM), a code division multiple access (Code Division Multiple Access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, an advanced long term evolution (advanced long term evolution, LTE-A) system, a new radio (new radio, NR) system, an evolutional system of the NR system, an LTE-based access to unlicensed spectrum (LTE-based access to unlicensed spectrum, LTE-U) system, an NR-based access to unlicensed spectrum (NR-based access to unlicensed spectrum, NR-U) system, a universal mobile telecommunication system (universal mobile telecommunication system, UMTS), a worldwide interoperability for microwave access (worldwide interoperability for microwave access, WiMAX) communication system, a wireless local area network (wireless local area networks, WLAN) system, wireless fidelity (wireless fidelity, WiFi) system, a next generation communication system, or other communication systems.

In general, traditional communication systems support a limited number of connections and are also easy to implement. However, with development of the communication technologies, mobile communication systems will not only support traditional communications, but also support, for example, device to device (device to device, D2D) communication, machine to machine (machine to machine, M2M) communication, machine type communication (machine type communication, MTC), and vehicle to vehicle (vehicle to vehicle, V2V) communication, etc., and the embodiments of the present application can also be applied to these communication systems.

The system architecture and service scenario described in the embodiments of the present application are intended to illustrate the technical solutions in the embodiments of the present application more clearly, but do not constitute a limitation to the technical solutions provided in the embodiments of the present application. Those of ordinary skilled in the art may know that the technical solutions provided in the embodiments of the present application are also applicable to similar technical problems as the network architecture evolves and a new service scenario emerges.

The network device involved in the embodiments of the present application may be an ordinary base station (such as a NodeB or eNB or gNB), a new radio controller (new radio controller, NR controller), a centralized network element (centralized unit), a new radio base station, a remote radio module, a micro base station, a relay (relay), a distributed network element (distributed unit), a transmission reception point (transmission reception point, TRP), a transmission point (transmission point, TP) or any other devices. The specific technology and specific device form adopted by the network device are not limited in the embodiments of the present application. For ease of description, in all the embodiments of the present application, the above-mentioned apparatuses that provide wireless communication functions to the terminal devices are collectively termed as the network device.

In the embodiments of the present application, the terminal device may be any terminal. For example, the terminal device may be a user equipment of machine type communication. That is to say, the terminal device also may be termed as a user equipment (user equipment, UE), a mobile station (mobile station, MS), a mobile terminal (mobile terminal), a terminal (terminal) or the like. The terminal device may communicate with one or more core networks via a radio access network (radio access network, RAN), for example, the terminal device may be a mobile phone (or known as a "cellular" phone), a computer with a mobile communication capacity, or the like, for another example, the terminal device may be a portable, pocket, handheld, computer-integrated or vehicle-mounted mobile apparatus; and they exchange language and/or data with the radio access network. There is no specific limitation in the embodiments of the present application.

In an implementation, the network device and the terminal device can be deployed on land, including indoor or outdoor, handheld or vehicle-mounted; or they can be deployed above water; or they can be deployed on airborne aircraft, balloons, and satellites. The network device and the terminal device are not limited in the embodiments of the present application with regard to their application scenario.

In an implementation, communications may be performed between a network device and a terminal device and between terminal devices through licensed spectrum (licensed spectrum), or through unlicensed spectrum (unlicensed spectrum), or through both licensed spectrum and unlicensed spectrum at the same time. Communications may be performed between a network device and a terminal device and between terminal devices through a frequency spectrum below 7 gigahertz (gigahertz, GHz), or through a frequency spectrum above 7 GHz, or through both a frequency spectrum below 7 GHz and a frequency spectrum above 7 GHz at the same time. The spectrum resource used between the network device and the terminal device is not limited in the embodiments of the present application.

In NR, for each downlink band width part (band width part, BWP) of a serving cell, maximum number of search space sets that may be configured is 10, where each search space set includes search spaces of one or more aggregation levels.

In addition, the search space set corresponds to time domain configuration information. The terminal device may monitor, according to the configured search space set, a candidate physical downlink control channel (physical downlink control channel, PDCCH) in a time domain position, so that there is no need to monitor a candidate PDCCH in each downlink subframe similar to LTE. The time domain configuration information of the search space set includes a monitoring period, a slot offset, number of slots, a symbol position, and a control resource set index.

The terminal device may monitor a candidate PDCCH in a search space by two steps: the first step is to determine, according to configuration information of a search space set, a control channel element (control channel element, CCE) index of each candidate PDCCH of a configured set of candidate PDCCHs in a control resource set (control resource set, CORESET); and the second step is to determine, from the configured set of candidate PDCCHs according to a preset rule, a set of candidate PDCCHs to be monitored, where the set of candidate PDCCHs to be monitored is the configured set of candidate PDCCHs or a subset of the configured set of candidate PDCCHs.

The search space set in the embodiments of the present application may be configured through higher-layer signaling, where configuration information indicated by the higher-layer signaling may indicate at least one of the following:

1) a monitoring period (that is, a period in which a PDCCH is monitored) and an offset, a symbol position in a slot;

where the monitoring period and the offset are used to determine a monitoring period in which a PDCCH is monitored and a monitoring slot in the monitoring period in which a PDCCH needs to be monitored, where the monitoring period may include an integral number of slots; and the symbol position in the slot is used to determine a starting symbol position of the PDCCH in the monitoring slot;

2) an aggregation level and the number of candidate PDCCHs corresponding thereto;

where the aggregation level may include at least one of 1, 2, 4, 8, and 16.

The CORESET in the embodiments of the present application may be configured through higher-layer signaling, where configuration information indicated by the higher-layer signaling may indicate at least one of the following:
a position and a size of a frequency domain resource, and a time domain length;
where the position and the size of the frequency domain resource are used to determine the position and the size of the frequency domain resource for monitoring a PDCCH; and the time domain length is used to determine the corresponding number of PDCCH symbols for monitoring the PDCCH.

In an embodiment of the present application, one search space set may correspond to one or more CORESETs, and one CORESET may correspond to one or more search space sets.

Figure 2:
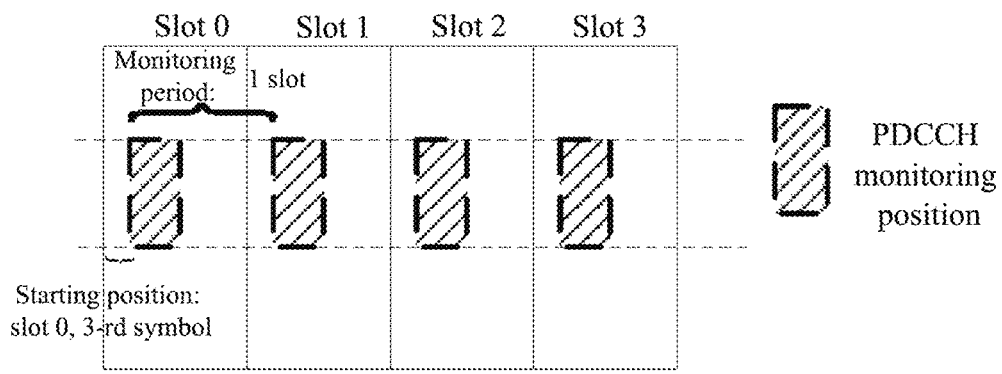
FIG. 2 is a schematic diagram of a PDCCH monitoring position determined based on a search space set and a CORESET.

In an embodiment of the present application, the terminal device may determine, according to a search space set and a CORESET configured by higher-layer signaling, a position of a PDCCH resource to be monitored. As an example, FIG. 2 is a schematic diagram of a PDCCH monitoring position determined based on a search space set and a CORESET. In an implementation, the monitoring position may also be termed as a monitoring resource. As shown in FIG. 2, a monitoring period of a PDCCH is a slot, and a starting symbol position of the PDCCH in the monitoring slot is a third symbol in each slot. In other words, a starting position of a monitoring resource included in a search space set shown in FIG. 2 is the third symbol in each slot.

As shown in FIG. 2, assuming that the resource size of the diagonal part includes 48 RBs (which may be an integral multiple of 6) in a frequency domain and 2 symbols in a time domain. Since 1 resource element group (resource element group, REG)=12 subcarriers*1 symbol, and 1 CCE=6REG, the resource of the above-mentioned diagonal part includes 16 CCEs, where one CCE is a minimal resource element over which a PDCCH can be transmitted. There may be a mapping relationship between the CCE and the REGs, for example, interleaving mapping or non-interleaving mapping.

In an embodiment of the present application, the aggregation level (aggregation level) may refer to multiple consecutive CCEs being used to transmit one PDCCH. For example, if the aggregation level is 2, it means that one PDCCH is transmitted through 2 consecutive CCEs; and if the aggregation level is 8, it means that one PDCCH is transmitted through 8 consecutive CCEs. In an embodiment of the present application, it can be considered that an aggregation level and the number of candidate PDCCHs corresponding thereto form a search space.

In an implementation, one search space set includes at least one search space. FIG. 3 is a schematic diagram of CCEs needs to be monitored in a search space set. As shown in FIG. 3, assuming that the CCEs in the CCE set shown in FIG. 2 are numbered from CCE 0 to CCE 15 and a monitoring start position is CCE 0 (the monitoring start position may be determined by formula calculation or determined according to a hash function or determined in other ways, here is an example). For aggregation level 1, assuming that the CCEs that the terminal device needs to monitor are CCE 0 to CCE 5 when there are 6 candidate PDCCHs; for aggregation level 2, assuming that the CCEs that the terminal device needs to monitor are CCE 0 to CCE 7 when there are 4 candidate PDCCHs; for aggregation level 4, assuming that the CCEs that the terminal device needs to monitor are CCE 0 to CCE 11 when there are 3 candidate PDCCHs; for aggregation level 8 and aggregation level 16, assuming that there are 0 candidate PDCCHs for both cases, the terminal device does not monitor CCEs under the aggregation levels. Therefore, it can be considered that the search space set includes search spaces with aggregation levels 1, 2, and 4.

In an embodiment of the present application, the terminal device may be configured with multiple search space sets. The search space sets may include a common search space set (common search space set, CSS set) and a terminal device-specific search space set (UE-specific search space set, USS set). The terminal device may monitor a common PDCCH and/or a terminal device-specific PDCCH through the common search space set, and monitor a terminal device-specific PDCCH through the terminal device-specific search space set. The network device can ensure that the complexity of the blind monitoring of the common search space set does not exceed the capability of the terminal device.

A PDCCH of a search space set configured by broadcast information may be mainly used to indicate reception of system information, a random access response, and a paging message. Since the broadcast information carries limited information therein, a time domain position, an aggregation level, the number of candidate control channels and an associated control resource set of the search space set may be configured through using a predefined or implicit manner. The aggregation level of the search space set configured by the broadcast information may be predefined as {aggregation level 4, aggregation level 8, and aggregation level 16}, and the candidate PDCCHs corresponding thereto have a number of {4, 2, and 1}, respectively.

An introduction has been made above to the PDCCH related information in the embodiments of the present application, and an introduction will be made hereunder with regard to how the terminal device implements PDCCH monitoring. On unlicensed spectrum, the network device needs to perform LBT (or channel detection) before transmitting a PDCCH. Transmission can be performed only when the LBT is successful; and transmission cannot be performed when the LBT is failed. Therefore, there is an opportunistic transmission on the unlicensed spectrum. In order to enable the network device to use an unlicensed spectrum resource for PDCCH transmission as soon as possible, one way is to use a relatively small time granularity (for example, a mini-slot with a length of 2 symbols) for PDCCH preparation and transmission when the network device is preempting a channel, and use a relatively large time granularity (for example, a slot) for PDCCH preparation and transmission during channel occupancy time after the channel is preempted.

Figure 4:
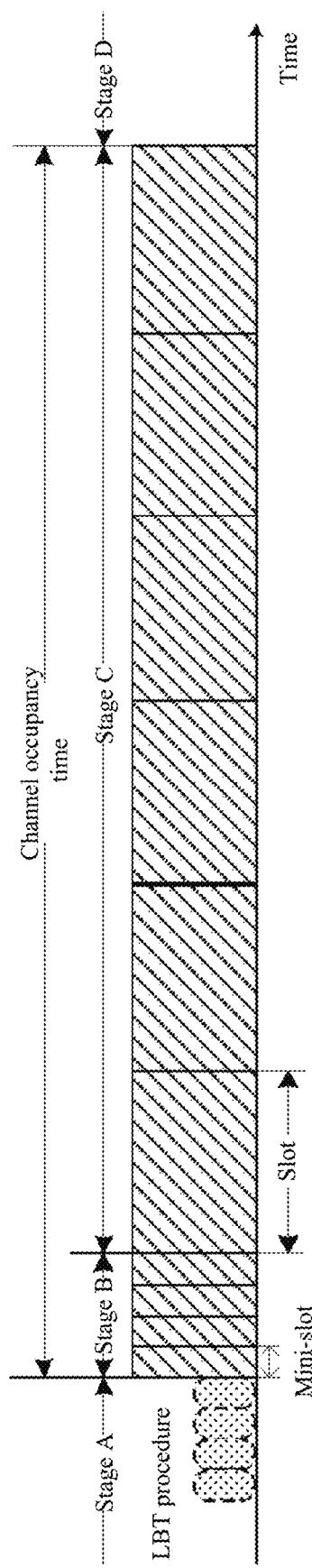
FIG. 4 is a schematic diagram of time domain resources when a network device performs downlink transmission.

For example, FIG. 4 is a schematic diagram of time domain resources when a network device performs downlink transmission. As shown in FIG. 4, the network device has a scheduling behavior including the following stages:
stage A: beyond channel occupancy time, the network device uses a relatively small time granularity (for example, a mini-slot) to prepare data transmission;
stage B: in an initial stage of the channel occupancy time, the network device uses a relatively small time granularity (for example, a mini-slot) for data transmission; and
stage C: in time which is within the channel occupancy time and other than the initial stage, the network device uses a relatively large time granularity (for example, a slot) for data transmission.

Correspondingly, the terminal device has a PDCCH blind monitoring behavior including also the following stages:

stage A: beyond channel occupancy time of the network device, the terminal device uses a relatively small time granularity (for example, a mini-slot) for PDCCH monitoring;

stage B: in an initial stage of the channel occupancy time of the network device, the terminal device uses a relatively small time granularity (for example, a mini-slot) for PDCCH monitoring; and stage C: in time within the channel occupancy time and other than the initial stage of the network device, the terminal device uses a large time granularity (for example, a slot) for PDCCH monitoring.

Specifically, the network device may configure two PDCCH monitoring periods for the terminal device. Among them, one PDCCH monitoring period is relatively small, e.g., a mini-slot, and one PDCCH monitoring period is relatively large, e.g., a slot. As shown in FIG. 4, in stages A and B, the terminal device uses a relatively small PDCCH monitoring period, i.e., a mini-slot, for PDCCH monitoring; and in stage C, the terminal device uses a relatively large PDCCH monitoring period, i.e., a slot, for PDCCH monitoring. In this way, it can ensure that the network device can perform downlink transmission as soon as possible after preempting a channel, and can also reduce the monitoring complexity of the terminal device during the channel occupancy time of the network device.

The above-mentioned PDCCH monitoring method is applicable to a load based equipment (load based equipment, LBE) channel access mode, that is, the network device may perform channel monitoring on unlicensed spectrum after a service arrives, and start to transmit a signal after the channel monitoring is successful.

Figure 5:
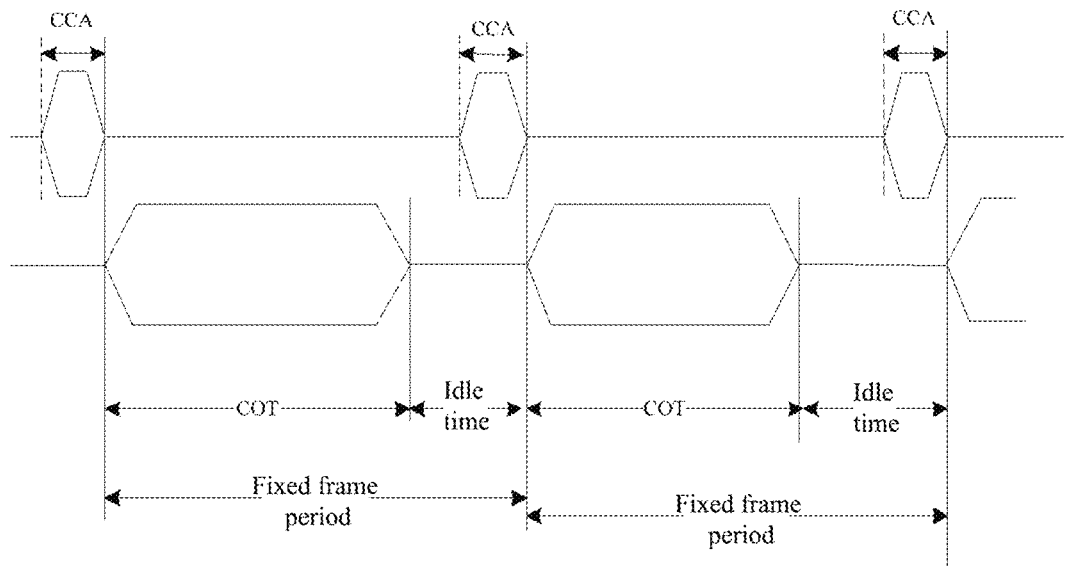
FIG. 5 is a schematic diagram of a frame structure in the FBE-based channel access mode.

It is worth noting that an NR system on unlicensed spectrum may also support a frame based equipment (Frame based equipment, FBE) channel access mode. For example, FIG. 5 is a schematic diagram of a frame structure in the FBE-based channel access mode. As shown in FIG. 5, in the FBE-based channel access mode, the frame structure appears periodically. One frame structure includes a fixed frame period (a length does not exceed 200 ms), a channel occupancy time (COT) (a length does not exceed 95% of the fixed frame period), idle time (a length is at least 5% of the channel occupancy time, a minimum length is 100 us, and it is located at an end of the fixed frame period).

In a practical application, as shown in FIG. 5, the communication device performs clear channel assessment (Clear Channel Assessment, CCA) on a channel in clearance time, e.g., before the start of a COT. If the channel detection is successful, a channel occupancy time (COT) in a next fixed frame period can be used to transmit a signal; and if the channel detection is failed, a channel occupancy time (COT) in a next fixed frame period cannot be used to transmit a signal. That is, in such an implementation, a channel resource opportunity of the communication device that can be used for service transmission appears periodically.

In the prior art, in the FBE-based channel access mode, there is currently no definite scheme with regard to how a terminal device performs PDCCH monitoring. A possible implementation is that the terminal device will always monitor downlink control information within channel occupancy time of a fixed frame period regardless of whether a network device transmits the downlink control information, however, this will render that the terminal device performs information monitoring for long time, and there is a problem of high power consumption and a waste of resources.

In light of the above-mentioned problem, an embodiment of the present application provides another control channel transmission method, in which a terminal device determines a first search space set within a channel occupancy time (COT) of a fixed frame period, and monitors a first PDCCH according to the first search space set, where the first PDCCH is used to transmit slot structure indication information, and the slot structure indication information is used to determine a slot structure of the COT. In this technical solution, the terminal device uses the determined first search space set to monitor the first PDCCH, and the slot structure indication information transmitted on the first PDCCH can be used to determine the slot structure of the COT, so that the terminal device may perform control information detection based on the determined slot structure of the COT, which is able to assist downlink control information detection to a certain extent, thereby avoiding a problem of resource waste resulting from long-term detection.

Hereinafter, the technical solution in the present application will be described in detail with specific embodiments. It should be noted that the technical solution in the present application may include part or all of the following content. The specific embodiments hereunder can be combined with each other. For the same or similar concepts or processes, repetitions may not be made in some embodiments.

Figure 6:
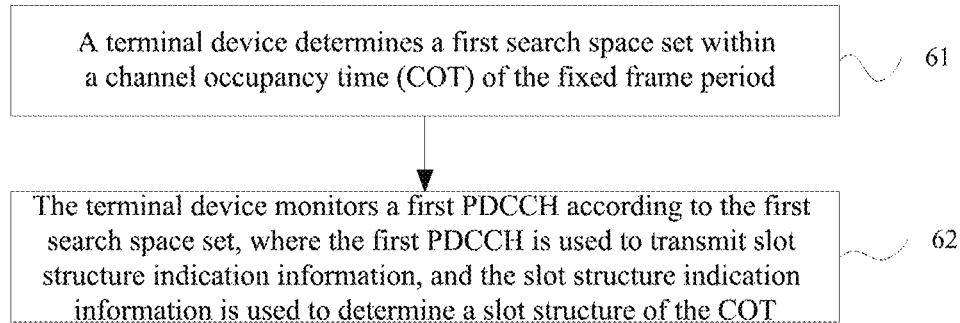
FIG. 6 is a schematic flowchart of Embodiment 1 of a control channel transmission method according to the present application.

FIG. 6 is a schematic flowchart of Embodiment 1 of a control channel transmission method according to the present application. An execution subject of the method is an apparatus with functions of a terminal device, or it may be a terminal device. In this embodiment, the method may include the following steps.

Step 61: a terminal device determines a first search space set within a channel occupancy time (COT) of a fixed frame period.

In an implementation, in an embodiment of the present application, at least one of a starting position of the fixed frame period, a length of the fixed frame period, a maximum length of the COT of the fixed period and other information may be preset, or indicated by a network device to the terminal device through higher-layer signaling, or may be agreed by the network device and the terminal device, for example, agreed based on a protocol or a regulation.

In an implementation, in an embodiment of the present application, the network device may configure a search space set for a terminal device located within its service range, and transmit corresponding higher-layer signaling to the terminal device side.

In an implementation, in an embodiment of the present application, the network device may configure a first search space set for the terminal device in a COT of each fixed frame period through higher-layer signaling, so that the terminal device monitors a PDCCH based on the configured first search space set.

In an implementation, in an embodiment of the present application, the higher-layer signaling includes radio resource control (radio resource control, RRC) information or media access control (media access control, MAC) control unit (control element, CE) information.

In an implementation, in an embodiment of the present application, the first search space set is preset, or the first search space set is agreed by the network device and the terminal device.

Step 62: the terminal device monitors a first PDCCH according to the first search space set, where the first PDCCH is used to transmit slot structure indication information, and the slot structure indication information is used to determine a slot structure of the COT.

In an implementation, in this embodiment, after determining the first search space set, the terminal device may monitor, according to the first search space set, whether the first PDCCH exists. It is understandable that the first PDCCH here is a candidate PDCCH, since the network device may transmit the first PDCCH through the first search space set or without the first search space set (for example, if the channel detection by the network device is failed, the first PDCCH may not be transmitted through the configured first search space set).

In an embodiment of the present application, the terminal device may determine, according to a CORESET and a first search space set configured by higher-layer signaling, a first candidate PDCCH to be monitored.

In an embodiment of the present application, before communicating with the terminal device, the network device may first detect a channel on unlicensed spectrum so as to determine whether a resource in a COT of the next fixed frame period is available; if available, a first PDCCH may be transmitted according to the first search space set in the COT so that slot structure indication information used to determine a slot structure of the COT is transmitted to the terminal device.

Correspondingly, the terminal device may monitor, according to the determined first search space set, whether the network device transmits the first PDCCH so as to determine whether it is possible to obtain the slot structure indication information in the first PDCCH that is used to determine the slot structure of the COT.

In an implementation, the first PDCCH may be a common PDCCH (which, for example, may be a group common (group common, GC) PDCCH (GC-PDCCH)).

It should be understood that the NR-U system supports a flexible slot format, where the slot format may be indicated as information about a downlink (Downlink) symbol, a flexible (Flexible) symbol, and an uplink (Uplink) symbol included in a slot. Such slot configuration may refer to different slot formats (slot format, SF).

At present, an NR protocol supports up to 256 slot formats, of which 26 slot formats are shown in Table 1. In Table 1, one row represents one slot format, "D" represents a downlink symbol, "U" represents an uplink symbol, and "F" represents a flexible symbol. It can be seen that slot format 0 indicates that all 14 symbols in a slot are downlink symbols; slot format 1 indicates that all 14 symbols in a slot are uplink symbols; and slot format 20 indicates that the two preceding symbols in a slot are configured as downlink symbols, the last symbol is configured as an uplink symbol, and the 11 intermediate symbols are configured as flexible symbols.

TABLE 1

| Slot for-mat | Symbol number of slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

In an implementation, the first PDCCH is used to transmit slot structure indication information. As an example, the slot structure indication information may be slot format indicator (slot format indicator, SFI) information. The first PDCCH can be used to transmit SFI information of at least one cell, and an SFI index (SFI-index) field in the first PDCCH can be used to indicate a slot format combination, where the slot format combination includes at least one slot format indicators.

In an implementation, the cyclic redundancy check (cyclic redundancy check, CRC) of the first PDCCH may be scrambled with slot format indication radio network temporary identity (slot format indication radio network temporary identity, SFI-RNTI), where the SFI-RNTI may be configured by higher-layers.

In the control channel transmission method provided in the embodiment of the present application, the terminal device uses the determined first search space set to monitor the first PDCCH, and the slot structure indication information transmitted on the first PDCCH can be used to determine the slot structure of the COT, so that the terminal device may perform control information detection based on the determined slot structure of the COT, which is able to assist downlink control information detection to a certain extent, thereby avoiding a problem of resource waste resulting from long-term detection.

In an implementation, a length or an ending position of the COT in the fixed frame period may be pre-configured or indicated by higher-layer signaling, or the length or the ending position of the COT in the fixed frame period may be determined by the slot structure indication information.

In an implementation, the COT of the fixed frame period may include at least one of the following resources: a resource used for downlink transmission, a resource used for uplink transmission, a resource used for sidelink transmission (for example, device to device transmission), and a resource not used for transmission (for example, clearance).

In a practical application, for example, in the NR-U system, a BWP of a terminal device may include one subband or multiple subbands. The subband may be an LBT subband, or the size of the subband is the size of the frequency band during LBT detection. When the BWP of the terminal device includes multiple subbands, different subbands may have different LBT results thereon since LBTs are separately performed on the different subbands.

As an example, BWP0 configured by the network device for the terminal device includes a first subband and a second subband, and both the first subband and the second subband are LBT subbands. When channel detection is performed on each of the LBT subbands, there may be a case that an LBT failure occurs on part of the subbands. For example, the first subband is presented with a success in its LBT result and the second subband is presented with a failure in its LBT result, in this situation, the network device may transmit the first PDCCH only via the first subband on which the LBT is successful; alternatively, the first subband is presented with a failure in its LBT result and the second subband is presented with a success in its LBT result, at this point, the network device may transmit the first PDCCH only via the second subband on which the LBT is successful.

However, for the terminal device, the subband on which the LBT is failed also belongs to a frequency resource included in BWP0 configured by the network device for the terminal device. Therefore, the network device needs to notify the terminal device of the information that the subband on which the LBT is failed cannot be used in the COT (or the network device needs to notify the terminal device of the information about the subband on which the LBT is successful in the COT), so that the terminal device does not perform PDCCH monitoring on the subband on which the LBT is failed in the COT.

In an embodiment of the present application, the first PDCCH may also be used to transmit frequency domain resource indication information, and the frequency domain resource indication information is used to determine frequency domain resource usage of the COT.

It should be understood that the network device is prepared in advance when performing downlink transmission and the downlink transmission in the COT is performed immediately after the LBT is successful, but the information about whether the frequency domain resource is available is determined after the LBT ends (or at the starting time of the COT), therefore, the network device needs a certain processing time to transmit the frequency domain resource indication information to the terminal device.

In an embodiment of the present application, the first search space set includes a first monitoring resource, the first monitoring resource is located in the COT, and there is an offset between a starting position of the first monitoring resource and a starting position of the COT.

As an example, the first search space set includes a first monitoring resource having an offset between a starting position and a starting position of the COT. At this point, the network device may transmit to the terminal device, over the first monitoring resource, the first PDCCH that is used to transmit the slot structure indication information. Therefore, when performing monitoring in the COT of the fixed frame period, the terminal device may determine whether the fixed frame period is available based on whether the first PDCCH is monitored over the first monitoring resource.

As another example, the first search space set includes a first monitoring resource where there is an offset between a starting position and a starting position of the COT. At this point, the network device may transmit to the terminal device, over the first monitoring resource, the first PDCCH that is used to transmit the frequency domain resource indication information. Therefore, when performing monitoring in the COT of the fixed frame period, the terminal device may determine the frequency domain resource that is available in the COT based on the first PDCCH is monitored over the first monitoring resource.

Figure 7:
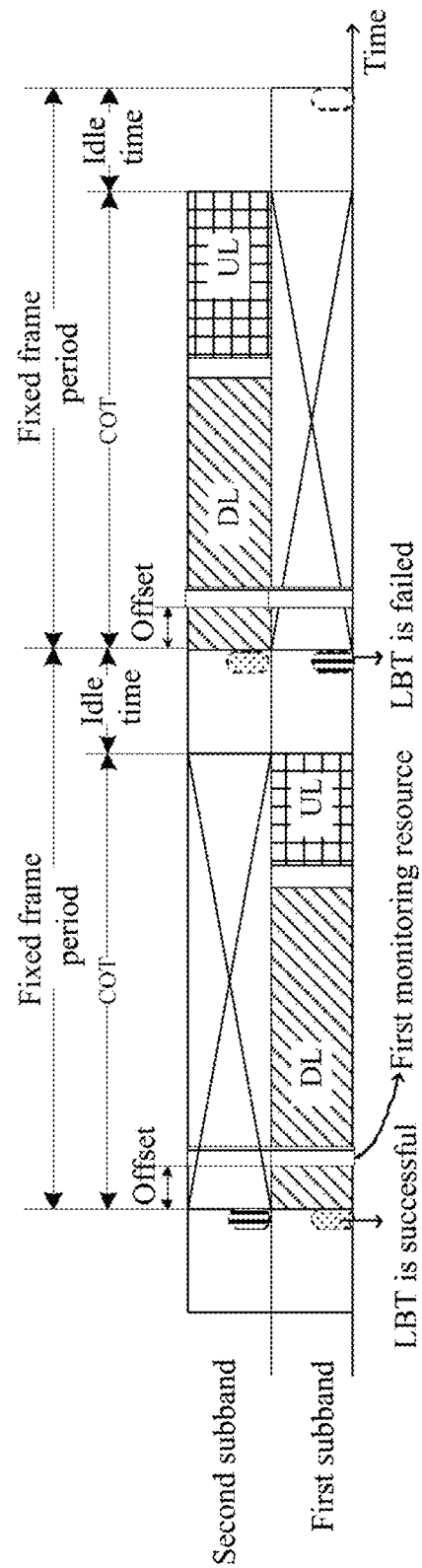
FIG. 7 is a schematic diagram of a position of a first monitoring resource included in a first search space set according to the present application.

In this embodiment, FIG. 7 is a schematic diagram of a position of a first monitoring resource included in a first search space set according to the present application. As shown in FIG. 7, the network device may indicate, through the frequency domain resource indication information, whether the frequency domain resource in the COT is available. Specifically, when the first monitoring resource is located in the COT and there is an offset between the starting position of the first monitoring resource and the starting position of the COT, the network device may transmit, over the first monitoring resource, the first PDCCH further containing the frequency domain resource indication information.

With reference to FIG. 7, BWP0 configured by the network device for the terminal device includes a first subband and a second subband, and both the first subband and the second subband are LBT subbands. For example, an LBT result of the first subband is different from that of the second subband, at this point, in this embodiment, the frequency domain resource indication information that is used to determine the frequency domain resource usage of the COT and the slot structure indication information that is used to determine the slot structure of the COT may be transmitted to the terminal device through the first PDCCH together.

For example, with reference to FIG. 7, in a first fixed frame period, if the LBT result of the first subband is presented with a success and the LBT result of the second subband is presented with a failure, then the network device may transmit the first PDCCH only via the first subband on which the LBT is successful; and the terminal device may monitor, via the first subband, the first PDCCH over the first monitoring resource having an offset from the starting position of the COT, and then determine, according to the frequency domain resource indication information transmitted on the first PDCCH transmission, that the first subband is available and the second subband is unavailable. Correspondingly, in a 2-nd fixed frame period, when the LBT result of the first subband is presented with a failure and the LBT result of the second subband is presented with a success, it also may be determined via the first PDCCH transmitted by the first monitoring resource that the first subband is unavailable and the second subband is available.

this type of embodiment of the present application may be applied to a scenario where it is necessary to indicate whether a frequency domain resource is available, or applied to a scenario where a frequency domain resource includes at least two subbands.

In an embodiment of the present application, the first monitoring resource is a 1-st monitoring resource of the first search space set within the COT. In other words, only after determining frequency domain resource indication information, the network device transmits, over the first monitoring resource, a first PDCCH carrying slot structure indication information and the frequency domain resource indication information to the terminal device.

In an implementation, the slot structure indication information is used to indicate a slot structure starting from the starting position of the COT in the fixed frame period, or the slot structure indication information is used to indicate a slot structure starting from the first monitoring resource in the fixed frame period.

In an implementation, since there is an offset between the starting position of the first monitoring resource and the starting position of the COT, the resource corresponding to the offset can be considered as a downlink resource, alternatively, after determining that a resource in the COT is available, the network device may perform downlink transmission through a resource between the starting position of the COT and the starting position of the first monitoring resource.

In this embodiment, the first monitoring resource, where the starting position included in the first search space set has an offset with the starting position of the COT, is used to transmit a first PDCCH, and the first PDCCH is further used to transmit frequency domain resource indication information, thus the network device may have enough time to prepare and transmit the frequency domain resource indication information.

In an implementation, the above-mentioned offset is greater than or equal to a length of one time unit, or the offset is determined according to the processing time of the network device. The time unit may be, for example, a symbol, a slot, or a subframe.

As an example, in order to ensure that the network device has enough processing time to determine whether a frequency resource of the terminal device is available, the offset between the starting position of the first monitoring resource and the starting position of the COT may be greater than or equal to a length of one symbol, or the magnitude of the offset is determined according to the processing time of the network device so as to ensure that the network device has enough time to prepare the frequency domain resource indication information.

In this embodiment, the processing time of the network device refers to the time required for the network device when determining whether the COT can be used to generate the frequency domain resource indication information. In an implementation, before communicating with the terminal device, the network device may transmit the processing time to the terminal device, for example, in a form of broadcasting, so that the terminal device may calculate the magnitude of the offset based on the received processing time of the network device.

Since the processing time is the time required for the network device to generate the frequency domain resource indication information, the terminal device may obtain accurate frequency domain resource indication information by means of monitoring the first PDCCH at the first monitoring resource, thereby ensuring that the obtained frequency domain resource usage of the COT is correct.

For example, the offset is one slot, and the starting position of the monitoring resource included in the first search space set includes a 1-st symbol on a 2-nd slot of the COT.

For example, a fixed frame period includes 10 slots, a COT of the fixed frame period includes 9 preceding slots of the 10 slots, e.g., at least part of the resources from slot 0 to slot 9, a first search space set has a monitoring period of 5 slots, a monitoring slot in the monitoring period is a 2-nd slot in the monitoring period, that is, slot 1 and slot 6 in the COT, and a starting symbol of a monitoring resource on the monitoring slot is a 1-st symbol. Therefore, the starting symbols of the monitoring resources of the first search space set included in the fixed frame period are a 1-st symbol on slot 1 and a 1-st symbol on slot 6. A starting symbol of a first monitoring resource is the 1-st symbol on slot 1.

As another example, the offset is preset, alternatively, the offset is transmitted by the network device to the terminal device through indication information.

In an implementation, the above-mentioned indication information used to determine the offset may be high-layer signaling.

In this embodiment, the offset may be determined by the network device based on the processing time required for the network device when determining whether the COT can be used to generate the frequency domain resource indication information. In an implementation, before communicating with the terminal device, the network device may transmit the determined offset to the terminal device, for example, in a form of higher-layer signaling (for example, RRC signaling or MAC signaling), in this way the terminal device may directly obtain the offset. Therefore, the terminal device may accurately indicate the frequency domain resource usage of the COT by means of monitoring, at the first monitoring resource, the frequency domain resource indication information acquired via the first PDCCH.

In this embodiment, the offset between the starting position of the first monitoring resource and the starting position of the COT may be preset, for example, agreed in advance by the terminal device and the network device.

In an implementation, the offset between the starting position of the first monitoring resource and the starting position of the COT may also be determined by the network device, and transmitted to the terminal device through indication information in advance, that is, the offset is known before the terminal device monitors the first PDCCH.

As an example, the network device may configure a first search space set for the terminal device through higher-layer signaling. The starting symbol of the monitoring resource included in the first search space set does not include the starting position of the COT in the fixed frame period.

In another embodiment of the present application, the first search space set includes a second monitoring resource, and the second monitoring resource has a starting position identical to a starting position of the COT.

In this embodiment, since the terminal device needs to determine a slot structure of a COT according to whether a first PDCCH is monitored in a first search space set, the sooner the network device transmits the first PDCCH in a first COT, the sooner the terminal device can know the slot structure of the COT, thus the sooner it can assist the terminal device in monitoring a second PDCCH. In an implementation, the second PDCCH is another PDCCH other than the first PDCCH.

Figure 8:
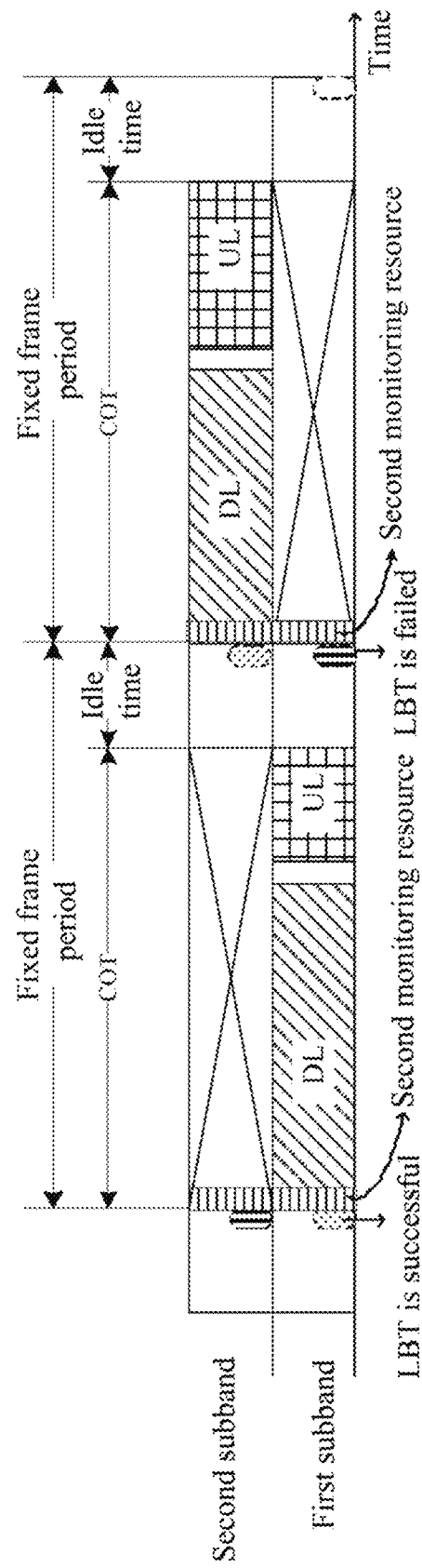
FIG. 8 is a schematic diagram of a position of a second monitoring resource included in the first search space set according to the present application.

For example, FIG. 8 is a schematic diagram of a position of a second monitoring resource included in the first search space set according to the present application. As shown in FIG. 8, therefore, in this embodiment, the first search space set includes a second monitoring resource having a starting position identical to a starting position of the COT. At this point, the first PDCCH that is used to transmit the slot structure indication information may be transmitted to the terminal device over the second monitoring resource. At this point, when performing monitoring in the COT of the fixed frame period, the terminal device may determine whether the fixed frame period is available based on whether the first PDCCH is monitored over the first monitoring resource.

In this embodiment, the second monitoring resource includes a 1-st symbol on a 1-st slot of the COT.

For example, the second monitoring resource is configured at the starting position of the COT. For example, a starting position of a 1-st monitoring resource (that is, the second monitoring resource) of the first search space set within the COT includes a 1-st symbol on a 1-st slot of the COT. That is, the network device may immediately transmit the first PDCCH after performing the LBT successfully before the start of the COT, or the network device may not transmit the first PDCCH in a first COT after the LBT is failed.

In this embodiment, when the second monitoring resource has a starting position identical to a starting position of the COT, that is, when the second monitoring resource of the first search space set is configured at the starting position of the COT, the network device, due to its preparation in advance during downlink transmission, immediately performs the downlink transmission after the LBT is successful;

however, information about whether a frequency domain resource is available is determined after the LBT ends, therefore, at the beginning of the downlink transmission, the network device cannot prepare the frequency resource indication information that is used to determine that a subband is available or unavailable. This type of embodiment of the present application may be applied to a scenario where it is not necessary to indicate whether a frequency domain resource is available, or applied to a scenario where a frequency domain resource includes one subband.

In another type of embodiment of the present application, the first search space set includes a first monitoring resource and a second monitoring resource, where there is a offset between a starting position of the first monitoring resource and a starting position of the COT, and the second monitoring resource has a starting position identical to a starting position of the COT.

Figure 9:
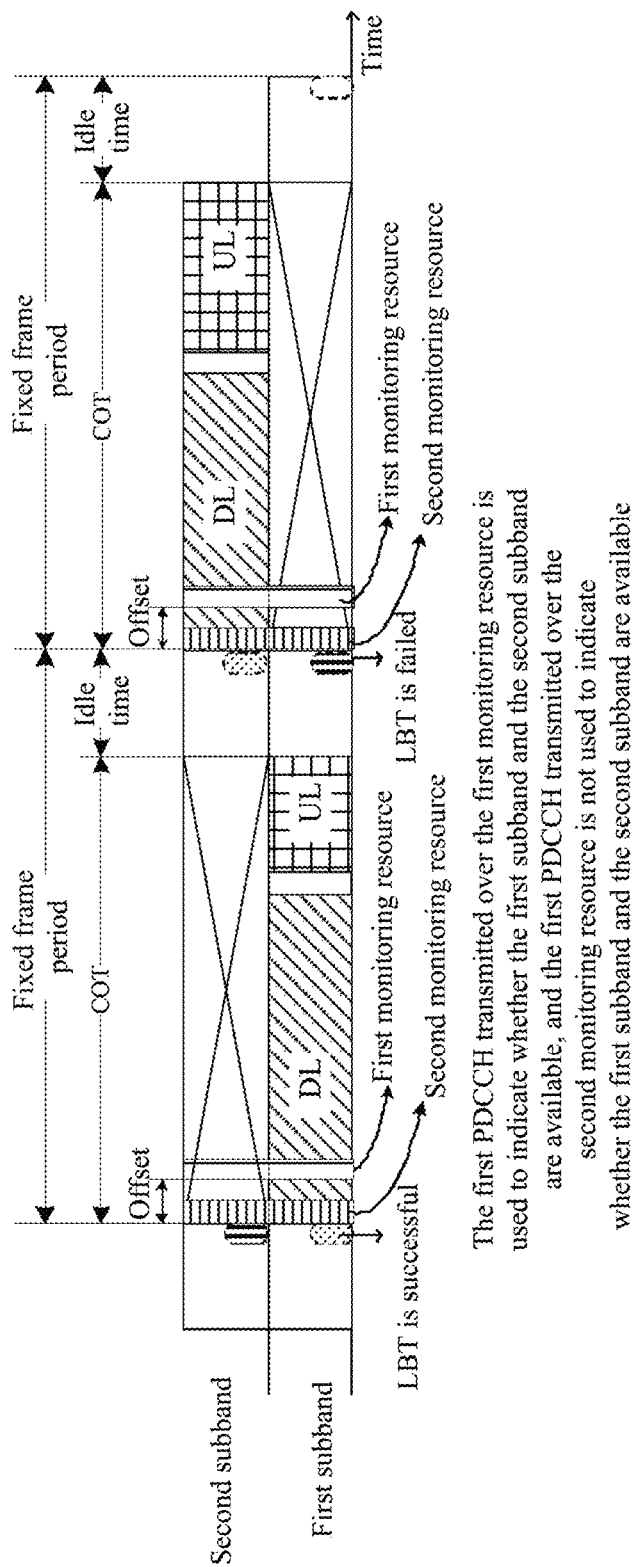
FIG. 9 is a schematic diagram of positions of the first monitoring resource and the second monitoring resource included in the first search space set according to the present application.

In an implementation, FIG. 9 is a schematic diagram of positions of the first monitoring resource and the second monitoring resource included in the first search space set according to the present application. As shown in FIG. 9, the first PDCCH transmitted over the second monitoring resource is not used to transmit frequency domain resource indication information; or the first PDCCH transmitted over the second monitoring resource is used to transmit frequency domain resource indication information, and the frequency domain resource indication information is not used to determine frequency domain resource usage of the COT.

In this embodiment, the first search space set includes at least two monitoring resources in the COT, that is, at least two time domain positions that can be monitored. With reference to FIG. 9, at the beginning of the downlink transmission, since the network device cannot prepare the frequency resource indication information that is used to determine that a subband is available or unavailable, for a second monitoring resource having a starting position identical to a starting position of the COT, the first PDCCH transmitted over the second monitoring resource is not used to transmit frequency domain resource indication information, that is, the first PDCCH transmitted over the second monitoring resource is not used to indicate whether the first subband and the second subband are available, or the frequency domain resource indication information transmitted on the first PDCCH transmitted over the second monitoring resource is not used to determine frequency domain resource usage of the COT, so as to prevent the terminal device from acquiring wrong frequency resource indication information. However, another monitoring resource included in the first search space set may be used to indicate effective frequency domain resource indication information, for example, the first PDCCH transmitted over the first monitoring resource having an offset from the starting position of the COT may be used to indicate whether the first subband and the second subband are available.

For example, assuming that the frequency domain resource indication information includes N bits, the first PDCCH is transmitted over both the first monitoring resource and the second monitoring resource, and the second monitoring resource is located before the first monitoring resource. Downlink control information transmitted on the first PDCCH over the first monitoring resource includes N-bit frequency domain resource indication information, and the N-bit frequency domain resource indication information is used to determine an available or unavailable frequency domain resource in the COT. However, since the network device may not prepare the frequency domain resource indication information when transmitting the first PDCCH over the second monitoring resource, although the downlink control information transmitted on the first PDCCH over the second monitoring resource also includes the N-bit frequency domain resource indication information, the N-bit frequency domain indication information is not used to determine an available or unavailable frequency domain resource in the COT. For example, the N-bit frequency domain indication information is in a special state (for example, all zeros). The special state is used to indicate that the network device has not yet prepared the frequency domain indication information. Alternatively, another possible manner that the N-bit frequency domain resource indication information may not be included in the downlink control information transmitted on the first PDCCH over the second monitoring resource.

In an implementation, this scheme is also applied to a scenario where it is necessary to indicate whether a frequency domain resource is available, or this scheme is applied to a scenario where at least two subbands are included in a frequency domain.

In an implementation, the first monitoring resource and the second monitoring resource included in the first search space set are monitoring resources in the same slot.

For example, a fixed frame period includes 10 slots, a COT of the fixed frame period includes 9 preceding slots of the 10 slots, e.g., at least part of the resources from slot 0 to slot 9, a first search space set has a monitoring period of 5 slots, a monitoring slot in the monitoring period is a 1-st slot in the monitoring period, that is, slot 0 and slot 5 in the COT, and a starting symbol of a monitoring resource on the monitoring slot includes a 1-st symbol and an 8-th symbol. Therefore, the starting symbols of the monitoring resources of the first search space set included in the fixed frame period are symbol 0 on slot 0, symbol 7 on slot 0, symbol 0 on slot 5 and symbol 7 on slot 5. A starting symbol of a second monitoring resource is symbol 0 on slot 0, a starting symbol of a first monitoring resource may include symbol 7 on slot 0, and an offset has 7 symbols.

In an implementation, the first monitoring resource and the second monitoring resource included in the first search space set are monitoring resources in different slots.

For example, a fixed frame period includes 10 slots, a COT of the fixed frame period includes 9 preceding slots of the 10 slots, e.g., at least part of the resources from slot 0 to slot 9, a first search space set has a monitoring period of 5 slots, a monitoring slot in the monitoring period is a 1-st slot in the monitoring period, that is, slot 0 and slot 5 in the COT, and a starting symbol of a monitoring resource on the monitoring slot is a 1-st symbol. Therefore, the starting symbols of the monitoring resources included in the first search space set in the fixed frame period are symbol 0 on slot 0 and symbol 0 on slot 5. A starting symbol of a second monitoring resource is symbol 0 on slot 0, a starting symbol of a first monitoring resource may include symbol 0 on slot 5, and an offset has 5 slots.

For another example, a fixed frame period includes 10 slots, a COT of the fixed frame period includes 9 preceding slots of the 10 slots, e.g., at least part of the resources from slot 0 to slot 9, a first search space set has a monitoring period of 5 slots, monitoring slots in the monitoring period are a 1-st slot and a 2-nd slot in the monitoring period, that is, slot 0, slot 1, slot 5 and slot 6 in the COT, and a starting symbol of a monitoring resource on the monitoring slot is a 1-st symbol. Therefore, the starting symbols of the monitoring resources included in the first search space set in the fixed frame period are symbol 0 on slot 0, symbol 0 on slot 1, symbol 0 on slot 5, and symbol 0 on slot 6. A starting symbol of a second monitoring resource is symbol 0 on slot 0, a starting symbol of a first monitoring resource may include symbol 0 on slot 1, and an offset has 1 slot.

In this embodiment, considering that the network device needs a certain processing time to transmit the frequency domain resource indication information to the terminal device, the network device configures, in the COT, multiple monitoring resources for monitoring transmission of the first PDCCH, and prepares the frequency domain resource indication information to transmit the first PDCCH through a subsequent monitoring resource, and then transmits the frequency domain resource indication information that is used to determine the frequency domain resource usage of the COT to the terminal device.

In this embodiment, the information transmitted in the first PDCCH transmitted over different monitoring resources may be different, or the information transmitted in the first PDCCH transmitted over different monitoring resources is same but content indicated by the information is different.

For example, in this embodiment, the first monitoring resource has an offset from the starting position of the COT, and the second monitoring resource has a starting position identical to the starting position of the COT.

As an example, the first PDCCH transmitted over the second monitoring resource includes slot structure indication information; and the first PDCCH transmitted over the first monitoring resource includes slot structure indication information and frequency domain resource indication information.

As another example, the first PDCCH transmitted over the second monitoring resource includes slot structure indication information and frequency domain resource indication information, where the frequency domain resource indication information is not used to determine frequency domain resource usage of the COT; and the first PDCCH transmitted over the first monitoring resource includes slot structure indication information and frequency domain resource indication information, where the frequency domain resource indication information is used to determine frequency domain resource usage of the COT.

In any of the foregoing embodiments, the first search space set has a monitoring period less than or equal to the fixed frame period.

In an implementation, the fixed frame period is an integral multiple of the monitoring period of the first search space set.

For example, the integral multiple may be a multiple of 1, 2, and 4 and other different values. The specific value of the integral multiple may be determined according to an actual situation, and details will not be described here again.

In this embodiment, through a configuration that the first search space set has a monitoring period less than or equal to the fixed frame period, it can be ensured that each fixed frame period has a control resource for transmitting the slot structure indication information and/or the frequency domain resource indication information, so that the terminal device may determine a slot structure in the COT and/or frequency domain resource usage in the COT according to the information.

Figure 10:
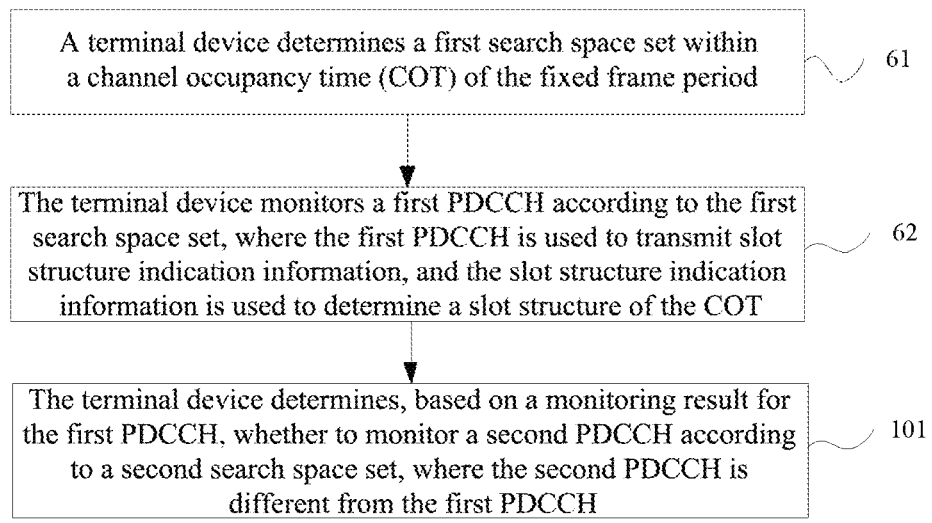
FIG. 10 is a schematic flowchart of Embodiment 2 of a control channel transmission method according to the present application.

Based on the foregoing embodiments, FIG. 10 is a schematic flowchart of Embodiment 2 of a control channel transmission method according to the present application. As shown in FIG. 10, in this embodiment, the method may also include at least part of the following content.

Step 101, the terminal device determines, based on a monitoring result for the first PDCCH, whether to monitor a second PDCCH according to a second search space set, where the second PDCCH is different from the first PDCCH.

In this embodiment, after monitoring the first PDCCH according to the first search space set, the terminal device may determine a monitoring result for the first PDCCH, and determine, based on the monitoring result, whether to monitor a second PDCCH according to a second search space set.

In this embodiment, the second PDCCH being different from the first PDCCH includes at least one of the following.

1) The second search space set is different from the first search space set.

In this embodiment, the first PDCCH needs to be monitored according to the first search space set, and the second PDCCH needs to be monitored according to the second search space set. Different PDCCHs may be determined according to different search space sets.

2) A search space corresponding to the second PDCCH is different from a search space corresponding to the first PDCCH.

For example, the second PDCCH is different from the first PDCCH in terms of corresponding monitoring periods and offsets, and symbol positions in monitoring slots; and/or, the second PDCCH is different from the first PDCCH in terms of corresponding aggregation levels and corresponding numbers of candidate PDCCHs.

3) A downlink control information format corresponding to the second PDCCH is different from a downlink control information format corresponding to the first PDCCH.

For example, the format corresponding to the first PDCCH is format 2-0, and the format corresponding to the second PDCCH is one of format 0-0, format 0-1, format 1-0, format 1-1, format 2-1, format 2-2, and format 2-3. The detected PDCCHs vary with different formats.

4) A radio network temporary identifier (radio network temporary identifier, RNTI) used for cyclic redundancy check (cyclic redundancy check, CRC) scrambling of the second PDCCH is different from an RNTI used for CRC scrambling of the first PDCCH.

For example, the RNTI used for the CRC scrambling of the first PDCCH is an SFI-RNTI, and the RNTI used for the CRC scrambling of the second PDCCH is not an SFI-RNTI. For example, the RNTI used for the CRC scrambling of the second PDCCH is one of the following: a cell RNTI (cell RNTI, C-RNTI), a configured scheduling RNTI (configured scheduling RNTI, CS-RNTI), a modulation and coding scheme C-RNTI (modulation and coding scheme C-RNTI, MCS-C-RNTI), a semi-persistent CSI-RNTI (semi-persistent CSI RNTI, SP-CSI-RNTI), a temporary C-RNTI (temporary C-RNTI, TC-RNTI), a paging RNTI (paging RNTI, P-RNTI), a system information RNTI (system information RNTI, SI-RNTI), a random access RNTI (random access RNTI, RA-RNTI), a common control RNTI (common control RNTI, CC-RNTI), a group RNTI (group RNTI, G-RNTI), an interruption RNTI (interruption RNTI, INT-RNTI), a transmit power control-PUSCH-RNTI (transmit power control-PUSCH-RNTI, TPC-PUSCH-RNTI), a transmit power control-PUCCH-RNTI (transmit power control-PUCCH-RNTI, TPC-PUCCH-RNTI), an transmit power control-sounding reference symbols-RNTI (transmit power control-sounding reference symbol s-RNTI, TPC-SRS-RNTI), a sidelink RNTI (sidelink RNTI, SL-RNTI), etc. The detected PDCCHs vary with different RNTIs.

5) The second PDCCH is a terminal device-specific PDCCH and the first PDCCH is a common PDCCH.

For example, the format corresponding to the first PDCCH is one of format 2-0, format 2-1, format 2-2, and format 2-3; and the format corresponding to the second PDCCH is one of format 0-0, format 0-1, format 1-0 and format 1-1.

For another example, the first PDCCH is a group common PDCCH, and the control information transmitted on the first PDCCH is used to indicate a slot format in the COT; and the control information transmitted on the second PDCCH is a downlink grant for scheduling a terminal device to perform downlink reception, or an uplink grant for scheduling the terminal device to perform uplink transmission.

In an implementation, this step maybe implemented by the following manner.

As an example, when the first PDCCH is monitored, the terminal device monitors the second PDCCH in the COT according to the slot structure indication information and the second search space set.

Figure 11:
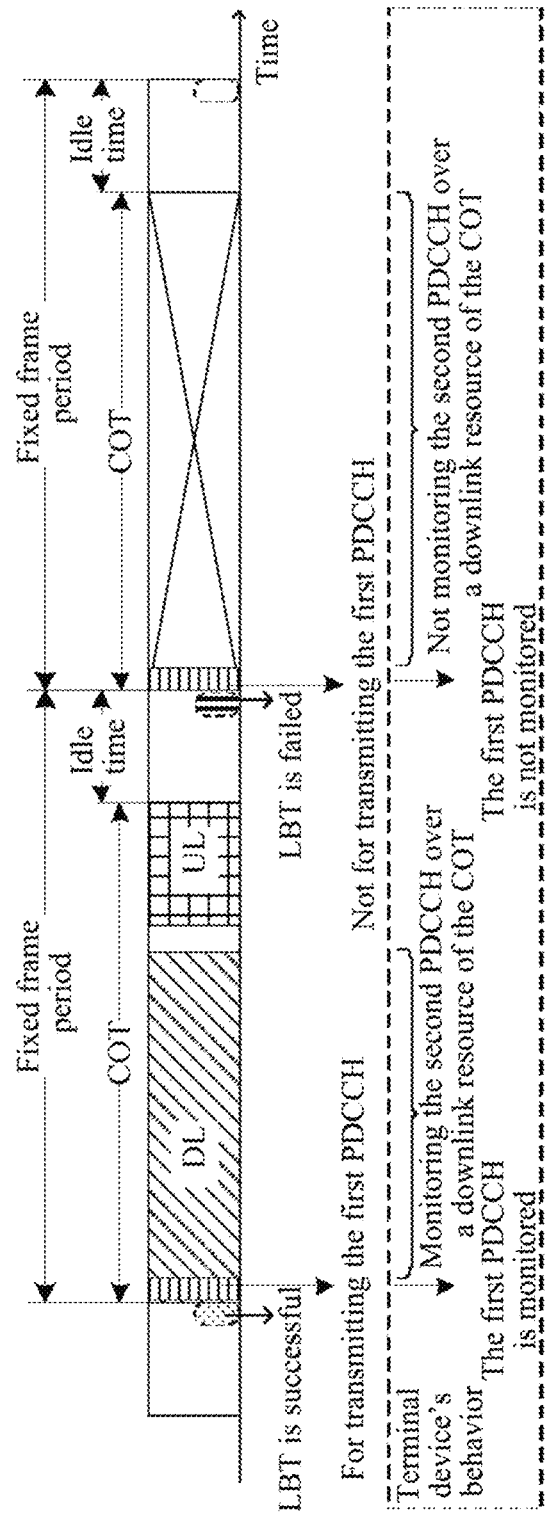
FIG. 11 is a schematic diagram illustrating whether a terminal device performs monitoring on a second PDCCH is determined based on a monitoring result for a first PDCCH.

For example, FIG. 11 is a schematic diagram illustrating whether the terminal device executes monitoring on the second PDCCH is determined based on the monitoring result for the first PDCCH. As shown in FIG. 11, in this embodiment, if the LBT of the network device is successful, then the network device may use a monitoring resource having a starting position the same as the starting position of the COT to transmit the first PDCCH.

If the first PDCCH is monitored by the terminal device, it may indicate that downlink signal transmission is performed after the LBT of the network device is successful. Therefore, the terminal device has a behavior including: determining a slot structure in the first COT according to the slot structure indication information in the first PDCCH, and monitor the second PDCCH according to a downlink resource in the determined slot structure and the configured second search space set until the end of the first COT.

As another example, when the first PDCCH is not monitored, the terminal device does not monitor the second PDCCH in the COT.

In an implementation, if the first PDCCH is not monitored by the terminal device, it is highly probable that downlink signal transmission is not performed due to the LBT of the network device being failed. Therefore, the terminal device has a behavior including: not monitoring the second PDCCH in the first COT.

In this embodiment, the terminal device that executes this kind of example may include a terminal device for which an energy-saving function is configured by the network device and/or a terminal device of which energy-saving needs to be reported to the network device. At the same time, the terminal device that executes this kind of embodiment is also a terminal device for which a first search space set is configured by the network device; moreover, a first PDCCH monitored according to the first search space set is used to transmit slot structure indication information, and the slot structure indication information is used to determine a slot structure of the COT.

In this embodiment, the terminal device determines whether to perform monitoring on the second PDCCH in the COT according to whether the first PDCCH carrying the slot structure indication information is monitored, which reduces the complexity of blind monitoring of the terminal device and achieves a power-saving effect.

As another example, when the first PDCCH is not monitored, the terminal device monitors the second PDCCH in the COT according to the second search space set.

In this embodiment, if the first PDCCH is not monitored by the terminal device, then the terminal device may have a behavior including: performing monitoring on the second PDCCH in the COT according to the configured second search space set, until the end of the first COT.

In an implementation, the terminal device that executes this kind of example includes a terminal device for which an energy-saving function is not configured by the network device and/or a terminal device of which energy-saving is not reported to the network device. At the same time, the terminal device that executes this kind of example is also a terminal device for which a first search space set is configured by the network device.

In this embodiment, if the first PDCCH is not monitored by the terminal device, monitoring on the second PDCCH is still performed according to the configured second search space set. Since the monitoring on the second PDCCH is independent of the first PDCCH, a power-saving effect may be achieved to a certain extent, and performance penalty resulting from missed detection of the first PDCCH may also be reduced.

In this embodiment, when the first search space set is configured, and the first search space set includes a first monitoring resource that is located in the COT and whose starting position has an offset from the starting position of the COT, where the first monitoring resource is a 1-st monitoring resource in the COT, the terminal device may perform downlink signal or downlink channel detection over a resource between the starting position of the COT of the fixed frame period and the starting position of the first monitoring resource.

For example, if a monitoring resource in the second search space set of the terminal device includes a resource in a first time period from the starting position of the COT of the fixed frame period to the end of the offset, the terminal device may perform monitoring on the second PDCCH within the first time period.

In an implementation, if the second PDCCH is not monitored within the first time period by the terminal device and the first PDCCH is not monitored over the first monitoring resource, then the terminal device may start monitoring from a next fixed frame period, and/or, if the terminal device monitors the second PDCCH within the first time period or monitors the first PDCCH over the first monitoring resource, the terminal device needs to monitor an entire frame period, that is, keep monitoring the second PDCCH within the COT of the fixed frame period until the end of the COT.

In an implementation, when the first search space set is configured and the first search space set includes a second monitoring resource having a starting position identical to a starting position of the COT, monitoring on the second PDCCH within the COT is performed according to the first PDCCH if the first PDCCH is monitored at the starting position of the COT by the terminal device. If the first PDCCH is not monitored at the starting position of the first COT by the terminal device, then monitoring on the second PDCCH is not performed within the first COT.

In an implementation, for a case where the first search space set includes multiple monitoring resources, if the first PDCCH is not monitored over a monitoring resource with a first time domain position among the multiple monitoring resources by the terminal device, then monitoring on the second PDCCH is not performed within the COT; or, monitoring on the first PDCCH is performed over another monitoring resource within the COT, and monitoring on the second PDCCH is performed after the first PDCCH is monitored.

In an embodiment of the present application, the first PDCCH corresponds to an aggregation level greater than or equal to a preset aggregation level.

In this embodiment, since the first PDCCH is used to transmit slot structure indication information determining the slot structure of the COT, moreover, since the greater the aggregation level used, the greater the transmission accuracy rate, the aggregation level used for transmission with the first PDCCH needs to be greater than or equal to a preset aggregation level.

In an implementation, the preset aggregation level may be 8. In this case, the aggregation level corresponding to the first PDCCH may be an aggregation level of 8 or 16. Or, if the aggregation levels corresponding to the first PDCCH are aggregation levels including 8 and 16, then it can be considered that the preset aggregation level is 8.

In this embodiment, in order to avoid the situation that the network device transmits the first PDCCH but the terminal device cannot correctly receive the first PDCCH, the network device may use a relatively high aggregation level, such as an aggregation level of 8 or 16, to transmit the first PDCCH, thereby improving the probability of correct transmission of the first PDCCH.

In an embodiment of the present application, for the terminal device that is not configured with the first search space set, that is, when the terminal device is not configured with the slot structure indication information, the terminal device performs monitoring on the second PDCCH within the COT according to a default behavior.

Specifically, the terminal device monitors the configured second search space set within the COT until the end of the COT. If the second PDCCH is monitored by the terminal device, the terminal device has a behavior including: performing downlink reception or uplink transmission according to the second PDCCH; if the second PDCCH is not monitored by the terminal device, the terminal device may have a behavior including: performing monitoring on the second PDCCH within the COT according to the configured second search space set until the end of the COT.

In the control channel transmission method provided in the embodiments of the present application, for the terminal device that is not configured with the first search space set, the terminal device may monitor the second PDCCH according to the second search space set, and perform a corresponding operation based on a monitoring result, for example, when the second PDCCH is monitored, perform downlink reception or uplink transmission according to the second PDCCH; and when the second PDCCH is not monitored, perform monitoring on the second PDCCH within the COT according to the configured second search space set until the end of the COT, thereby control channel transmission may still be achieved according to the method.

Figure 12:
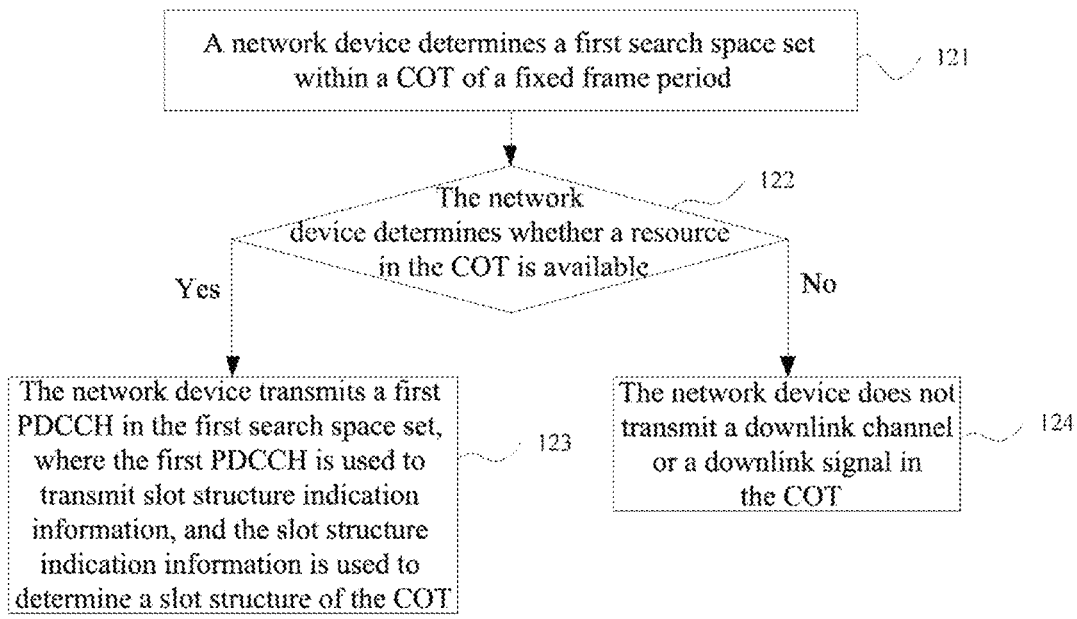
FIG. 12 is a schematic flowchart of Embodiment 3 of a control channel transmission method according to the present application.

FIG. 12 is a schematic flowchart of Embodiment 3 of a control channel transmission method according to the present application. An execution subject of the method is an apparatus with functions of a network device, or it may be a network device. In this embodiment, the method may include at least part of the following content.

Step 121: a network device determines a first search space set within a COT of a fixed frame period.

In an implementation, the network device may configure a search space set for a terminal device located within its service range, and transmit corresponding higher-layer signaling to the terminal device side.

In an implementation, the network device may configure a first search space set for the terminal device in a COT of a fixed frame period through higher-layer signaling, so that the terminal device monitors a PDCCH based on the configured first search space set.

In an implementation, the first search space set is preset, or the first search space set is agreed by the network device and the terminal device.

Step 122: the network device determines whether a resource in the COT is available; if yes, performing Step 123, and/or, if not, performing Step 124.

In this embodiment, the network device performs channel detection on a channel in a clearance time within a COT of a preceding fixed frame period before the fixed frame period. If the channel detection is successful, it is considered that a resource in the COT of the fixed frame period can be used for signal transmission, and Step 123 is executed accordingly; or, if the channel detection is failed, it is considered that a resource in the COT of the fixed frame period cannot be used for signal transmission, and Step 124 is executed accordingly.

Step 123: the network device transmits a first PDCCH in the first search space set, where the first PDCCH is used to transmit slot structure indication information, and the slot structure indication information is used to determine a slot structure of the COT.

In this embodiment, if the network device determines that the resource in the COT of the fixed frame period is available, then the network device may transmit a first PDCCH over the resource in the first search space set when the fixed frame period arrives, correspondingly, in order to enable the terminal device to know a structure of the COT, the first PDCCH may be used to transmit slot structure indication information that is used to determine a slot structure of the COT.

Step 124: the network device does not transmit a downlink channel or a downlink signal in the COT.

If the network device determines that the resource in the COT is unavailable, for example, the channel detection of the network device is failed, at this point, the network device does not transmit a downlink channel or a downlink signal in the COT, and then continues to perform channel detection before a next fixed frame period based on LBT.

According to the control channel transmission method provided in the embodiments of the present application, a network device determines a first search space set within a COT of a fixed frame period, transmits a first PDCCH in the first search space when it is determined that a resource in the COT is available, and does not transmit a downlink channel or a downlink signal in the COT when it is determined that a resource in the COT is unavailable, where the first PDCCH is used to transmit slot structure indication information, and the slot structure indication information is used to determine a slot structure of the COT. In this technical solution, when determining that the COT of the fixed frame period is available, the network device may transmit the slot structure indication information that is used to determine the slot structure of the COT to the terminal device, which is able to assist downlink control information detection to a certain extent, thereby avoiding a problem of resource waste resulting from long-term detection.

In an embodiment of the present application, the first search space set includes a first monitoring resource, the first monitoring resource is located in the COT, and there is an offset between a starting position of the first monitoring resource and a starting position of the COT.

In an implementation, the first PDCCH transmitted over the first monitoring resource is further used to transmit frequency domain resource indication information, and the frequency domain resource indication information is used to determine frequency domain resource usage of the COT.

As an example, the offset is greater than or equal to a length of one symbol, or the offset is determined according to processing time of the network device.

As another example, the offset is preset, or the offset is transmitted by the network device to a terminal device through indication information.

In another embodiment of the present application, the first search space set includes a second monitoring resource, and the second monitoring resource has a starting position identical to a starting position of the COT.

In an implementation, the second monitoring resource includes a first symbol on a first slot of the COT.

In this embodiment, the first PDCCH transmitted over the second monitoring resource is not used to transmit frequency domain resource indication information; or the first PDCCH transmitted over the second monitoring resource is used to transmit frequency domain resource indication information, and the frequency domain resource indication information is not used to determine frequency domain resource usage of the COT.

In yet another embodiment of the present application, the first search space set has a monitoring period less than or equal to the fixed frame period.

For example, the fixed frame period is an integral multiple of the monitoring period of the first search space set.

In yet another embodiment of the present application, after the network device transmits the first physical downlink control channel (PDCCH) in the first search space set, the method further includes:

the network device transmits a second PDCCH in a second search space set, where the second PDCCH is different from the first PDCCH.

The second PDCCH being different from the first PDCCH includes at least one of the following:

the second search space set is different from the first search space set;

a search space corresponding to the second PDCCH is different from a search space corresponding to the first PDCCH;

a downlink control information format corresponding to the second PDCCH is different from a downlink control information format corresponding to the first PDCCH; and an RNTI used for CRC scrambling of the second PDCCH is different from an RNTI used for CRC scrambling of the first PDCCH.

In yet another embodiment of the present application, the first PDCCH corresponds to an aggregation level greater than or equal to a preset aggregation level.

For implementation schemes on the network device side and details that have not been elaborated, reference may be made to recitations on the terminal device side described above, and details will not be described here again.

Figure 13:
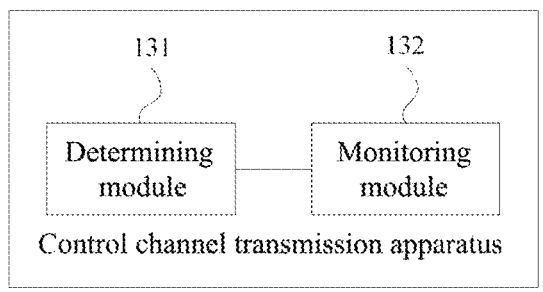
FIG. 13 is a schematic structural diagram of Embodiment 1 of a control channel transmission apparatus according to the present application.

FIG. 13 is a schematic structural diagram of Embodiment 1 of a control channel transmission apparatus according to the present application. The apparatus may be integrated in a terminal device, or it may be a terminal device. As shown in FIG. 13, the apparatus may include: a determining module 131 and a monitoring module 132.

The determining module 131 is configured to determine a first search space set within a channel occupancy time (COT) of a fixed frame period; and the monitoring module 132 is configured to monitor a first physical downlink control channel (PDCCH) according to the first search space set, the first PDCCH is used to transmit slot structure indication information, and the slot structure indication information is used to determine a slot structure of the COT.

In an embodiment of the present application, the first search space set includes a first monitoring resource, the first monitoring resource is located in the COT, and there is an offset between a starting position of the first monitoring resource and a starting position of the COT.

In an implementation, the first PDCCH transmitted over the first monitoring resource is further used to transmit frequency domain resource indication information, and the frequency domain resource indication information is used to determine frequency domain resource usage of the COT.

In an implementation, the offset is greater than or equal to a length of one symbol, or the offset is determined according to processing time of a network device.

In an implementation, the offset is preset, or the offset is transmitted by a network device to a terminal device through indication information.

In another embodiment of the present application, the first search space set includes a second monitoring resource, and the second monitoring resource has a starting position identical to a starting position of the COT.

In an implementation, the second monitoring resource includes a first symbol on a first slot of the COT.

In an embodiment of the present application, the first PDCCH transmitted over the second monitoring resource is not used to transmit frequency domain resource indication information; or the first PDCCH transmitted over the second monitoring resource is used to transmit frequency domain resource indication information, and the frequency domain resource indication information is not used to determine frequency domain resource usage of the COT.

In yet another embodiment of the present application, the first search space set has a monitoring period less than or equal to the fixed frame period.

In an implementation, the fixed frame period is an integral multiple of the monitoring period of the first search space set.

In yet another embodiment of the present application, the determining module 131 is further configured to: determine, based on a monitoring result for the first PDCCH, whether to monitor a second PDCCH according to a second search space set, where the second PDCCH is different from the first PDCCH.

The second PDCCH being different from the first PDCCH includes at least one of the following:

the second search space set is different from the first search space set;

a search space corresponding to the second PDCCH is different from a search space corresponding to the first PDCCH;

a downlink control information format corresponding to the second PDCCH is different from a downlink control information format corresponding to the first PDCCH;

a radio network temporary identifier (RNTI) used for cyclic redundancy check (CRC) scrambling of the second PDCCH is different from an RNTI used for CRC scrambling of the first PDCCH.

In this embodiment, the determining module is specifically configured to:

determine to monitor the second PDCCH in the COT according to the slot structure indication information and the second search space set under a circumstance that the first PDCCH is monitored; or, determine not to monitor the second PDCCH in the COT under a circumstance that the first PDCCH is not monitored; or, determine to monitor the second PDCCH in the COT according to the second search space set under a circumstance that the first PDCCH is not monitored.

In an implementation, after determining to monitor the second PDCCH in the COT according to the slot structure indication information and the second search space set, the determining module is further configured to determine a downlink resource in the COT according to the slot structure indication information; and the monitoring module is further configured to monitor the second PDCCH according to the downlink resource in the COT and the second search space set.

In any one of the forgoing embodiments of the present application, the first PDCCH corresponds to an aggregation level greater than or equal to a preset aggregation level.

The apparatus provided in this embodiment is configured to perform the technical solution on the terminal device side in the foregoing method embodiments; and implementation principles and technical effects therebetween are similar, and details will not be described here again.

Figure 14:
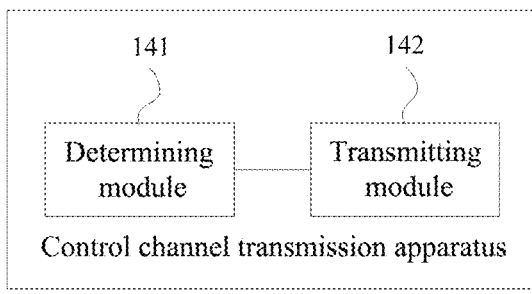
FIG. 14 is a schematic structural diagram of Embodiment 2 of a control channel transmission apparatus according to the present application.

FIG. 14 is a schematic structural diagram of Embodiment 2 of a control channel transmission apparatus according to the present application. The apparatus may be integrated in a network device, or it may be a network device. As shown in FIG. 14, the apparatus may include: a determining module 141 and a transmitting module 142.

The determining module 141 is configured to determine a first search space set within a channel occupancy time (COT) of a fixed frame period;

the transmitting module 142 is configured to transmit a first physical downlink control channel (PDCCH) in the first search space set when the determining module 141 determines that a resource in the COT is available, the first PDCCH is used to transmit slot structure indication information, and the slot structure indication information is used to determine a slot structure of the COT; and/or, the determining module 141, when determining that a resource in the COT is unavailable, is further configured to determine not to transmit a downlink channel or a downlink signal in the COT.

In an embodiment of the present application, the first search space set includes a first monitoring resource, the first monitoring resource is located in the COT, and there is an offset between a starting position of the first monitoring resource and a starting position of the COT.

In an implementation, the first PDCCH transmitted over the first monitoring resource is further used to transmit frequency domain resource indication information, and the frequency domain resource indication information is used to determine frequency domain resource usage of the COT.

In an implementation, the offset is greater than or equal to a length of one symbol, or the offset is determined according to processing time of a network device.

In an implementation, the offset is preset, or the offset is transmitted by the network device to the terminal device through indication information.

In another embodiment of the present application, the first search space set includes a second monitoring resource, and the second monitoring resource has a starting position identical to a starting position of the COT.

In an implementation, the second monitoring resource includes a first symbol on a first slot of the COT.

In an implementation, the first PDCCH transmitted over the second monitoring resource is not used to transmit frequency domain resource indication information; or the first PDCCH transmitted over the second monitoring resource is used to transmit frequency domain resource indication information, and the frequency domain resource indication information is not used to determine frequency domain resource usage of the COT.

In yet another embodiment of the present application, the first search space set has a monitoring period less than or equal to the fixed frame period.

In an implementation, the fixed frame period is an integral multiple of the monitoring period of the first search space set.

In yet another embodiment of the present application, after the first physical downlink control channel (PDCCH) is transmitted in the first search space set, the transmitting module 142 is further configured to transmit a second PDCCH in a second search space set, where the second PDCCH is different from the first PDCCH.

The second PDCCH being different from the first PDCCH includes at least one of the following:

the second search space set is different from the first search space set;

a search space corresponding to the second PDCCH is different from a search space corresponding to the first PDCCH;

a downlink control information format corresponding to the second PDCCH is different from a downlink control information format corresponding to the first PDCCH;

a radio network temporary identifier (RNTI) used for cyclic redundancy check (CRC) scrambling of the second PDCCH is different from an RNTI used for CRC scrambling of the first PDCCH.

In any one the foregoing embodiments of the present application, the first PDCCH corresponds to an aggregation level greater than or equal to a preset aggregation level.

The apparatus provided in this embodiment is configured to perform the technical solution on the network device side in the foregoing method embodiments; implementation principles and technical effects therebetween are similar, and details will not be described here again.

Notably, it should be understood that the modules of the above apparatus are only divided by a division of logical functions, and they may be fully or partially integrated into a physical entity during an actual implementation or may be physically separated. Moreover, these modules may all be implemented in the form of software and called by a processing element; or they may all be implemented in the form of hardware; or part of the modules may be implemented in the form of software called by a processing element and part of the modules may be implemented in the form of hardware. For example, the processing module may be a separately arranged processing element, or it may be integrated in a certain chip of the above-mentioned apparatus for implementation; in addition, it may also be stored in a memory of the above-mentioned apparatus in the form of program codes, and the functions of the above modules are called and executed by a certain processing element of the above-mentioned apparatus. Other modules are of a similar implementation. In addition, all or part of these modules may be integrated together or implemented independently. The processing element described here may be an integrated circuit with signal processing capability. During an implementation process, the steps of the above methods or the above modules may be achieved by an integrated logic circuit in the form of hardware in the processor element or instructions in the form of software.

For example, the above modules may be one or more integrated circuits configured to implement the above methods, e.g., one or more application specific integrated circuits (application specific integrated circuit, ASIC), or one or more microprocessors (digital signal processor, DSP), one or more field programmable gate arrays (field programmable gate array, FPGA), or the like. For another example, when one of the above modules is implemented by program codes scheduled by a processing element, the processing element may be a general-purpose processor, such as a central processing unit (central processing unit, CPU) or other processors that can call program codes. For another example, these modules may be integrated together and implemented in the form of a system-on-a-chip (system-on-a-chip, SOC).

All or part of the above-mentioned embodiments may be implemented by software, hardware, firmware, or any combination thereof. When the above-mentioned embodiments are implemented using software, all or part of them may be implemented in the form of a computer program product. The computer program product includes one or more computer instructions. When the computer program instructions are loaded and executed on a computer, all or part of the processes or functions described in the embodiments of the present application are generated. The computer may be a general-purpose computer, a special-purpose computer, a computer network, or other programmable apparatuses. The computer instructions may be stored in a computer-readable storage medium, or may be transmitted from one computer-readable storage medium to another computer-readable storage medium. For example, the computer instructions may be transmitted from one web site, computer, server, or data center to another web site, computer, server or data center in a wired manner (e.g., coaxial cables, optical fibers, digital subscriber lines (DSL)) or in a wireless manner (e.g., infrared, radio, microwave, etc.). The computer-readable storage medium may be any usable medium that can be accessed by a computer, or may be a data storage device, such as a server or a data center integrated with one or more available media. The usable medium may be a magnetic medium (for example, a floppy disk, a hard disk, and a magnetic tape), an optical medium (for example, a DVD), a semiconductor medium (for example, a solid state disk (solid state disk, SSD)) or the like.

Figure 15:
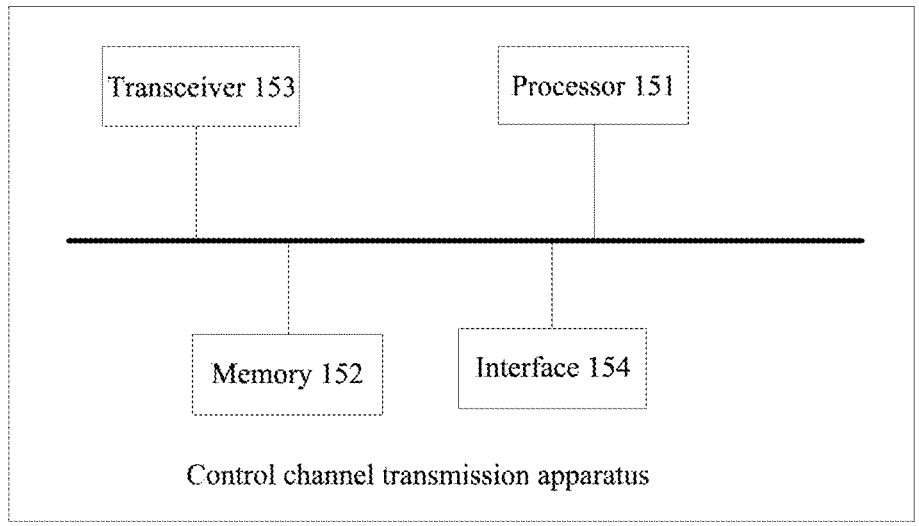
FIG. 15 is a schematic structural diagram of Embodiment 3 of a control channel transmission apparatus according to the present application.

FIG. 15 is a schematic structural diagram illustrating Embodiment 3 of a control channel transmission apparatus according to the present application. The apparatus may be integrated in a terminal device, or it may be a terminal device. As shown in FIG. 15, the apparatus may include: a processor 151, a memory 152, a transceiver 153, and an interface 154 in communication with a network device.

The memory 152 has stored therein a computer-executable instruction.

The processor 151 executes the computer-executable instruction stored in the memory 152 to enable the processor to execute the technical solution according to the control channel transmission method on the terminal device side in any one of the foregoing method embodiments.

Figure 16:
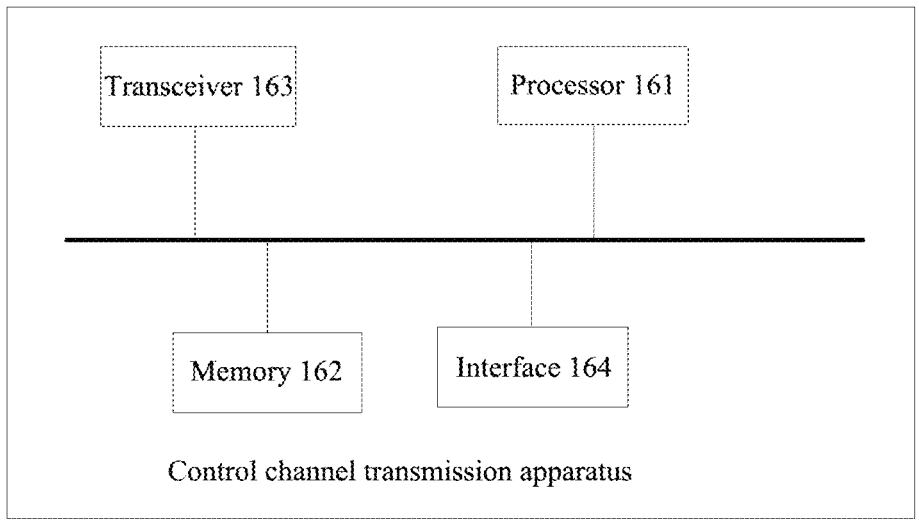
FIG. 16 is a schematic structural diagram of Embodiment 4 of a control channel transmission apparatus according to the present application.

FIG. 16 is a schematic structural diagram illustrating Embodiment 4 of a control channel transmission apparatus according to the present application. The apparatus may be integrated in a network device, or it may be a network device. As shown in FIG. 16, the apparatus may include: a processor 161, a memory 162, a transceiver 163, and an interface 164 in communication with a terminal device.

The memory 162 has stored therein a computer-executable instruction.

The processor 161 executes the computer-executable instruction stored in the memory 162 to enable the processor 161 to execute the technical solution according to the control channel transmission method on the network device side in any one of the foregoing method embodiments.

The present application further provides a computer-readable storage medium having stored therein a computer-executable instruction, where the technical solution on the terminal device side in any one of the foregoing method embodiments is implemented when the computer-executable instruction is executed by a processor.

The present application further provides a computer-readable storage medium having stored therein a computer-executable instruction, where the technical solution on the network device side in any one of the foregoing method embodiments is implemented when the computer-executable instruction is executed by a processor.

An embodiment of the present application further provides a program, where the technical solution on the terminal device side in the foregoing method embodiments is executed when the program is executed by a processor.

An embodiment of the present application further provides a program, where the technical solution on the network device side in the foregoing method embodiments is executed when the program is executed by a processor.

An embodiment of the present application further provides a computer program product including a program instruction, where the program instruction is used to implement the technical solution on the terminal device side in the foregoing method embodiments.

An embodiment of the present application further provides a computer program product including a program instruction, where the program instruction is used to implement the technical solution on the network device side in the foregoing method embodiments.

An embodiment of the present application further provides a chip including a processing module and a communication interface, where the processing module can execute the technical solution according to the terminal device side in the foregoing method embodiments.

Further, the chip also includes a storage module (such as a memory), where the storage module is configured to store an instruction, the processing module is configured to execute the instruction stored in the storage module, and the execution of the instruction stored in the storage module enables the processing module to execute the technical solution on the terminal device side.

An embodiment of the present application further provides a chip including a processing module and a communication interface, where the processing module can execute the technical solution on the network device side in the foregoing method embodiments.

Further, the chip also includes a storage module (such as a memory), where the storage module is configured to store an instruction, the processing module is configured to execute the instruction stored in the storage module, and the execution of the instruction stored in the storage module enables the processing module to execute the technical solution on the network device side.

In the present application, "at least one" refers to one or more, and "multiple" refers to two or more. "And/or" describes an association relationship between associated objects, indicating that there may be three relationships, for example, A and/or B may indicate presence of A only, of both A and B, and of B only, where A and B can be singular or plural. The character "/" generally indicates that contextually associated objects are in an "or" relationship; and in formulae, the character "/" indicates that contextually associated objects are in a "division" relationship. The expression "at least one of the following" or a similar expression refers to any combination of these items, including any combination in a single item or plural items. For example, at least one of a, b, or c may mean: a, b, c, a-b, a-c, b-c, or a-b-c, where a, b, and c can be singular or plural.

It is understandable that various numerical numbers involved in the embodiments of the present application are distinguished only for easy of description, but are not intend to limit the scope of the embodiments of the present application.

It is understandable that, in the embodiments of the present application, the sequence numbers of the above-mentioned processes do not mean a chronological order of execution, and an order of execution for the processes should be determined by their functions and internal logic, but should not impose any limitation to implementation process of the embodiments of the present application.

What is claimed is:

1. A control channel transmission method, comprising:
determining, by a terminal device, a first search space set within a channel occupancy time (COT) of a fixed frame period;
monitoring, by the terminal device, a first physical downlink control channel (PDCCH) according to the first search space set, wherein the first PDCCH is used to transmit slot structure indication information, and the slot structure indication information is used to determine a slot structure of the COT; and
determining, by the terminal device, based on the monitoring result for the first PDCCH, whether to monitor a second PDCCH according to a second search space set, wherein the second PDCCH is different from the first PDCCH;
wherein the second PDCCH being different from the first PDCCH comprises at least one of the following:
the second search space set is different from the first search space set;
a search space corresponding to the second PDCCH is different from a search space corresponding to the first PDCCH;
a downlink control information format corresponding to the second PDCCH is different from a downlink control information format corresponding to the first PDCCH;
a radio network temporary identifier (RNTI) used for cyclic redundancy check (CRC) scrambling of the second PDCCH is different from an RNTI used for CRC scrambling of the first PDCCH; and
the second PDCCH is a terminal device-specific PDCCH and the first PDCCH is a common PDCCH.

2. The method according to claim 1, wherein the first search space set comprises a first monitoring resource, the first monitoring resource is located in the COT, and there is an offset between a starting position of the first monitoring resource and a starting position of the COT.

3. The method according to claim 2, wherein the offset is preset, or the offset is transmitted by a network device to the terminal device through indication information.

4. The method according to claim 1, wherein the first search space set comprises a second monitoring resource, and the second monitoring resource has a starting position identical to a starting position of the COT.

5. The method according to claim 4, wherein the second monitoring resource comprises a first symbol on a first slot of the COT.

6. The method according to claim 1, wherein the determining, by the terminal device, based on the monitoring result for the first PDCCH, whether to monitor the second PDCCH according to the second search space set comprises:
determining, by the terminal device, to monitor the second PDCCH in the COT according to the slot structure indication information and the second search space set under a circumstance that the first PDCCH is monitored; or,
determining, by the terminal device, not to monitor the second PDCCH in the COT under the circumstance that the first PDCCH is not monitored; or,
determining, by the terminal device, to monitor the second PDCCH in the COT according to the second search space set under the circumstance that the first PDCCH is not monitored.

7. The method according to claim 6, wherein after the determining, by the terminal device, to monitor the second PDCCH in the COT according to the slot structure indication information and the second search space set, the method further comprises:
determining, by the terminal device, a downlink resource in the COT according to the slot structure indication information; and
monitoring, by the terminal device, the second PDCCH according to the downlink resource in the COT and the second search space set.

8. A control channel transmission apparatus, comprising:
a processor, a memory, a transceiver, and an interface in communication with a network device;
wherein the memory has stored therein a computer-executable instruction; and
the processor executes the computer-executable instruction stored in the memory to enable the processor to execute the method according to claim 1.

9. A non-transitory computer-readable storage medium having stored therein a computer-executable instruction, wherein the method according to claim 1 is implemented when the computer-executable instruction is executed by a processor.

10. A control channel transmission method, comprising:
determining, by a network device, a first search space set within a channel occupancy time (COT) of a fixed frame period;
transmitting, by the network device, a first physical downlink control channel (PDCCH) in the first search space set if the network device determines that a resource in the COT is available, wherein the first PDCCH is used to transmit slot structure indication information, and the slot structure indication information is used to determine a slot structure of the COT; and/or,
not transmitting, by the network device, a downlink channel or a downlink signal in the COT if the network device determines that the resource in the COT is unavailable;
wherein if the network device determines that the resource in the COT is available, the method further comprises:
transmitting, by the network device, a second PDCCH in a second search space set, wherein the second PDCCH is different from the first PDCCH;
wherein the second PDCCH being different from the first PDCCH comprises at least one of the following:

the second search space set is different from the first search space set;

a search space corresponding to the second PDCCH is different from the search space corresponding to the first PDCCH;

a downlink control information format corresponding to the second PDCCH is different from a downlink control information format corresponding to the first PDCCH;

a radio network temporary identifier (RNTI) used for cyclic redundancy check (CRC) scrambling of the second PDCCH is different from an RNTI used for CRC scrambling of the first PDCCH; and the second PDCCH is a terminal device-specific PDCCH and the first PDCCH is a common PDCCH.

11. The method according to claim 10, wherein the first search space set comprises a first monitoring resource, the first monitoring resource is located in the COT, and there is an offset between a starting position of the first monitoring resource and a starting position of the COT.

12. The method according to claim 11, wherein the offset is preset, or the offset is transmitted by the network device to a terminal device through indication information.

13. The method according to claim 10, wherein the first search space set comprises a second monitoring resource, and the second monitoring resource has a starting position identical to a starting position of the COT.

14. A control channel transmission apparatus, comprising:
a processor, a memory, a transceiver, and an interface in communication with a terminal device;
wherein the memory has stored therein a computer-executable instruction; and
the processor executes the computer-executable instruction stored in the memory to enable the processor to execute the method according to claim 10.

15. A non-transitory computer-readable storage medium having stored therein a computer-executable instruction, wherein the method according to claim 10 is implemented when the computer-executable instruction is executed by a processor.

* * * * *